(12) United States Patent
Kulbeth

(10) Patent No.: US 10,857,488 B1
(45) Date of Patent: Dec. 8, 2020

(54) SYSTEM FOR SEPARATING SOLIDS FROM A FLUID STREAM

(71) Applicant: DEL CORPORATION, Lafayette, LA (US)

(72) Inventor: Robert M. Kulbeth, Church Point, LA (US)

(73) Assignee: DEL Corporation, Scott, LA (US)

( * ) Notice: Subject to any disclaimer, the term of this patent is extended or adjusted under 35 U.S.C. 154(b) by 299 days.

(21) Appl. No.: 16/131,900

(22) Filed: Sep. 14, 2018

Related U.S. Application Data

(60) Provisional application No. 62/559,196, filed on Sep. 15, 2017.

(51) Int. Cl.

| | |
|---|---|
| *B01D 21/26* | (2006.01) |
| *B01D 21/00* | (2006.01) |
| *B01D 21/24* | (2006.01) |
| *B01D 36/04* | (2006.01) |
| *B01D 21/30* | (2006.01) |
| *B01D 19/00* | (2006.01) |
| *B01D 33/01* | (2006.01) |
| *B01D 33/41* | (2006.01) |

(52) U.S. Cl.
CPC ........ *B01D 21/267* (2013.01); *B01D 19/0042* (2013.01); *B01D 21/0006* (2013.01); *B01D 21/0012* (2013.01); *B01D 21/0042* (2013.01); *B01D 21/2461* (2013.01); *B01D 21/2472* (2013.01); *B01D 21/2494* (2013.01); *B01D 21/302* (2013.01); *B01D 33/01* (2013.01); *B01D 33/41* (2013.01); *B01D 36/045* (2013.01)

(58) Field of Classification Search
None
See application file for complete search history.

(56) References Cited

U.S. PATENT DOCUMENTS

| | | | | |
|---|---|---|---|---|
| 2,276,075 A | * | 3/1942 | Erb Wuensch | ....... E21B 21/065 175/66 |
| 2,817,440 A | * | 12/1957 | Casner | .................. E21B 21/065 209/208 |
| 3,777,405 A | * | 12/1973 | Crawford | .................. F26B 3/08 34/591 |

(Continued)

OTHER PUBLICATIONS

Applicant's copending U.S. Appl. No. 16/227,417, filed Dec. 20, 2018.

(Continued)

*Primary Examiner* — Robert J Popovics
(74) *Attorney, Agent, or Firm* — Jones Walker LLP

(57) ABSTRACT

A system for separating solids from a fluid includes a containment vessel having a V-shaped tank in fluid communication with an agitated overflow tank. Baffles within the V-shaped tank provide a series of zones where the fluid is deposited for processing. A shaftless auger at the bottom of the V-shaped tank transfers solids to an area where they are pumped to a first hydrocyclone assembly associated with a first shaker. Overflow from the hydrocyclone assembly and underflow from the first shaker is further processed by a second hydrocyclone assembly associated with a second shaker. Overflow from the second hydrocyclone assembly and underflow from the second shaker are deposited into overflow tank which contains the cleaned fluid.

20 Claims, 12 Drawing Sheets

(56) References Cited

U.S. PATENT DOCUMENTS

| | | | | |
|---|---|---|---|---|
| 4,090,523 A * | 5/1978 | Kelly, Jr. | | E21B 21/065 134/18 |
| 4,175,039 A * | 11/1979 | Fisher | | B01D 21/0018 134/10 |
| 4,247,312 A * | 1/1981 | Thakur | | B01D 21/00 96/159 |
| 4,274,963 A * | 6/1981 | Purvis | | B01D 21/003 209/464 |
| 4,366,063 A * | 12/1982 | O'Connor | | B01D 17/02 166/267 |
| 4,459,207 A * | 7/1984 | Young | | B01D 35/20 209/269 |
| 4,474,254 A * | 10/1984 | Etter | | E21B 21/06 175/206 |
| 4,482,459 A * | 11/1984 | Shiver | | B01D 36/00 210/639 |
| 4,507,208 A * | 3/1985 | Simon | | B01D 36/00 210/721 |
| 4,599,117 A * | 7/1986 | Luxemburg | | B01D 37/02 134/25.1 |
| 4,634,535 A * | 1/1987 | Lott | | B01D 21/00 210/780 |
| 4,636,308 A * | 1/1987 | Summers | | E21B 21/063 209/156 |
| 5,102,503 A * | 4/1992 | Silinski | | C02F 1/048 202/83 |
| 5,164,158 A * | 11/1992 | Brashears | | B09C 1/06 422/1 |
| 5,203,614 A * | 4/1993 | Robbins | | E21D 9/06 299/1.9 |
| 5,344,570 A * | 9/1994 | McLachlan | | E21B 21/065 175/206 |
| 5,361,998 A * | 11/1994 | Sirevag | | B09B 1/008 241/79.1 |
| 5,454,957 A * | 10/1995 | Roff, Jr. | | B01F 7/0065 210/768 |
| 5,570,749 A * | 11/1996 | Reed | | E21B 21/066 175/206 |
| 5,853,583 A * | 12/1998 | Shah | | B01D 33/0346 210/340 |
| 5,900,137 A * | 5/1999 | Homan | | B01D 17/005 210/85 |
| 5,928,519 A * | 7/1999 | Homan | | B01D 17/005 210/741 |
| 6,106,733 A * | 8/2000 | Wood | | E21B 21/066 210/774 |
| 6,214,092 B1 * | 4/2001 | Odom | | B01D 19/0042 210/188 |
| 6,390,006 B1 * | 5/2002 | Sridhar | | B63B 25/02 114/73 |
| 6,391,195 B1 * | 5/2002 | Layton | | B01D 21/01 210/195.1 |
| 6,505,743 B1 * | 1/2003 | Bandis | | B01D 21/00 209/173 |
| 6,506,310 B2 | 1/2003 | Kulbeth | | |
| 6,530,438 B1 * | 3/2003 | McIntyre | | B07B 1/06 175/66 |
| 6,533,946 B2 * | 3/2003 | Pullman | | B01D 21/0012 210/787 |
| 6,681,874 B2 * | 1/2004 | Risher | | E21B 21/065 175/206 |
| 6,808,354 B1 | 10/2004 | Kulbeth | | |
| 6,808,626 B2 | 10/2004 | Kulbeth | | |
| 6,976,819 B2 | 12/2005 | Kulbeth | | |
| 7,074,339 B1 * | 7/2006 | Mims | | B01D 21/0018 210/788 |
| 7,093,678 B2 * | 8/2006 | Risher | | E21B 21/065 175/206 |
| 7,135,107 B2 * | 11/2006 | Palmer | | B01D 21/0045 210/104 |
| 7,160,474 B2 * | 1/2007 | Harding | | B01D 21/0003 210/519 |
| 7,207,399 B2 * | 4/2007 | Duhe | | C02F 1/20 175/66 |
| 7,306,057 B2 * | 12/2007 | Strong | | B01D 17/0211 175/66 |
| 7,387,727 B2 * | 6/2008 | Inoue | | B01D 61/16 210/241 |
| 7,431,846 B2 * | 10/2008 | Palmer | | B01D 21/0045 175/66 |
| 7,476,318 B1 * | 1/2009 | Tibban | | B01D 21/003 175/66 |
| 7,514,011 B2 | 4/2009 | Kulbeth | | |
| 7,544,302 B2 * | 6/2009 | Harding | | E21B 21/065 210/519 |
| 7,572,370 B2 * | 8/2009 | Branner | | B01D 21/2461 210/220 |
| 7,727,389 B1 * | 6/2010 | Mallonee | | C02F 9/00 210/182 |
| 7,731,840 B1 * | 6/2010 | Mallonee | | C02F 11/004 210/143 |
| 8,133,164 B2 * | 3/2012 | Beebe | | E21B 21/065 494/31 |
| 8,137,550 B1 * | 3/2012 | Moe | | C02F 1/444 210/202 |
| 8,137,567 B1 * | 3/2012 | Moe | | C02F 1/56 210/725 |
| 8,216,459 B2 * | 7/2012 | Mallonee | | B09C 1/02 210/182 |
| 8,316,557 B2 * | 11/2012 | Burnett | | E21B 21/066 34/314 |
| 8,449,779 B2 | 5/2013 | Thompson | | |
| 8,517,167 B2 | 8/2013 | Thompson | | |
| 8,528,665 B2 * | 9/2013 | Jackson | | E21B 21/065 175/66 |
| 8,695,809 B2 * | 4/2014 | Sherwood | | E21B 21/01 210/384 |
| 8,834,726 B2 * | 9/2014 | Keister | | C01B 5/00 210/726 |
| 8,808,354 B2 | 10/2014 | Caro et al. | | |
| 9,073,104 B2 * | 7/2015 | Burnett | | B09C 1/06 |
| 9,296,953 B2 * | 3/2016 | Newman | | B03D 1/10 |
| 9,409,184 B1 * | 8/2016 | Mickelson | | B03B 9/00 |
| 9,447,646 B1 * | 9/2016 | Beason | | B01F 13/1033 |
| 9,498,739 B2 | 11/2016 | Thompson | | |
| 9,597,614 B2 | 3/2017 | Thompson | | |
| 9,687,761 B2 | 6/2017 | Thompson | | |
| 10,150,062 B2 * | 12/2018 | Dawson | | C02F 11/14 |
| 10,155,181 B2 * | 12/2018 | Dawson | | B60P 3/2245 |
| 10,184,300 B2 * | 1/2019 | Stegemoeller | | E21B 15/00 |
| 10,722,919 B2 * | 7/2020 | Beach | | B05B 1/06 |
| 10,751,654 B1 * | 8/2020 | Kulbeth | | B01D 17/0214 |
| 10,773,188 B1 * | 9/2020 | Kulbeth | | B01F 3/04241 |
| 2002/0033278 A1 * | 3/2002 | Reddoch | | E21B 21/066 175/57 |
| 2002/0074269 A1 * | 6/2002 | Hensley | | E21B 21/065 209/726 |
| 2002/0162807 A1 * | 11/2002 | Kulbeth | | B01D 21/0018 210/804 |
| 2003/0062325 A1 * | 4/2003 | Kulbeth | | B01D 21/02 210/804 |
| 2003/0136747 A1 * | 7/2003 | Wood | | B09C 1/06 210/774 |
| 2004/0208732 A1 * | 10/2004 | Kulbeth | | B65G 33/10 414/326 |
| 2005/0040119 A1 * | 2/2005 | Kulbeth | | B01D 21/2461 210/806 |
| 2005/0042064 A1 * | 2/2005 | Kulbeth | | B65G 33/10 414/319 |
| 2005/0194322 A1 * | 9/2005 | Palmer | | B01D 21/2444 210/715 |
| 2005/0279715 A1 * | 12/2005 | Strong | | E21B 21/066 210/774 |
| 2007/0075024 A1 * | 4/2007 | Campbell | | B01D 21/02 210/802 |
| 2007/0246431 A1 * | 10/2007 | Palmer | | B01D 21/2444 210/715 |

(56) References Cited

U.S. PATENT DOCUMENTS

| | | | | |
|---|---|---|---|---|
| 2008/0283301 A1* | 11/2008 | Sherwood | E21B 21/01 | 175/206 |
| 2009/0178978 A1* | 7/2009 | Beebe | E21B 21/065 | 494/43 |
| 2010/0193249 A1* | 8/2010 | Saiz | E21B 21/01 | 175/66 |
| 2011/0068063 A1* | 3/2011 | Mallonee | B09C 1/06 | 210/770 |
| 2012/0292257 A1* | 11/2012 | Hartley | B65G 41/002 | 210/709 |
| 2013/0037455 A1* | 2/2013 | Irwin | B07B 1/28 | 209/257 |
| 2013/0043195 A1* | 2/2013 | O'Konek | C02F 1/385 | 210/749 |
| 2013/0186622 A1* | 7/2013 | Thompson | E21B 43/34 | 166/267 |
| 2013/0200007 A1* | 8/2013 | O'Konek | C02F 1/385 | 210/749 |
| 2013/0220891 A1* | 8/2013 | Newman | C10G 1/045 | 208/390 |
| 2014/0175008 A1* | 6/2014 | Mathis | E21B 21/066 | 210/602 |
| 2014/0190904 A1* | 7/2014 | Sewell | E21B 21/066 | 210/768 |
| 2015/0060369 A1* | 3/2015 | Richie | C02F 1/5281 | 210/723 |
| 2015/0251108 A1* | 9/2015 | Hartley | B09B 3/0025 | 210/749 |
| 2016/0096124 A1* | 4/2016 | Marco | B01D 29/23 | 210/170.01 |
| 2016/0097247 A1* | 4/2016 | Marco | B01D 29/688 | 166/308.1 |
| 2016/0256799 A1* | 9/2016 | Thompson | B01D 21/283 | |
| 2017/0145802 A1* | 5/2017 | Thompson | B01D 21/2494 | |
| 2017/0252674 A1* | 9/2017 | Thompson | B65G 33/10 | |
| 2018/0117503 A1* | 5/2018 | Ross | B01D 21/262 | |
| 2018/0193773 A1* | 7/2018 | Thompson | E21B 43/34 | |
| 2019/0060794 A1* | 2/2019 | Droke | B01D 21/2472 | |
| 2019/0271200 A1* | 9/2019 | Coates | B01D 17/02 | |
| 2020/0101403 A1* | 4/2020 | Bollom | E21B 43/34 | |

OTHER PUBLICATIONS

Applicant's copending U.S. Appl. No. 16/229,324, filed Dec. 21, 2018.

Applicant's copending U.S. Appl. No. 16/290,350, filed Mar. 1, 2019.

Applicant's copending U.S. Appl. No. 16/393,718, filed Apr. 24, 2019.

Applicant's copending U.S. Appl. No. 16/529,513, filed Aug. 1, 2019.

* cited by examiner

SYSTEM FOR SEPARATING SOLIDS FROM A FLUID STREAM

CROSS-REFERENCE TO RELATED APPLICATIONS

This application claims the benefit of and priority to U.S. Provisional Patent Application No. 62/559,196, filed on Sep. 15, 2017, which is incorporated by reference herein.

BACKGROUND OF THE INVENTION

The present invention relates to systems and methods for separating solids from a fluid stream.

SUMMARY OF THE DISCLOSURE

The present invention is drawn to a system for separating solids from a fluid stream. The system may comprise a containment vessel having a front sidewall, a rear sidewall, a left sidewall, and a right sidewall. The containment vessel may include an open top and a closed bottom. The containment vessel may be divided by an overflow weir into a processing tank and an overflow tank. The overflow weir may extend from the bottom of the vessel to the top of the vessel and contain an opening so that a clean fluid substantially free of solids contained within the overflow tank may flow through the opening and into the processing tank. The processing tank may have a V-shape.

The processing tank may include a shaftless auger operatively positioned at the bottom of the vessel and extending substantially the entire length of the processing tank. The auger may be configured to rotate in a direction that transports solids collected at the bottom of the processing tank towards the front sidewall of the vessel. The processing tank may include a desilted mud zone defined by the overflow weir and a first underflow baffle operatively positioned transverse to the left and right sides of the vessel and extending from the top of the vessel to a point above the bottom of the vessel. The processing tank may include a desanded mud zone defined by the first underflow baffle and a second underflow baffle operatively positioned transverse to the left and right sides of the vessel and extending from the top of the vessel to a point above the bottom of the vessel. The processing tank may include a sand trap zone defined by the second under flow baffle and a third underflow baffle operatively positioned transverse to the left and right sides of the vessel and extending from the top of the vessel to a point above the bottom of the vessel. The processing tank may include a degasser mud zone defined by the third underflow baffle and the front sidewall of the vessel.

The system may include a scalping shaker operatively positioned above the top of the vessel over the sand trap zone of the processing tank. The scalping shaker may be configured to receive a first fluid containing solids and to process the first fluid containing solids to partially separate solids from the fluid and to produce a first underflow fluid containing solids that is deposited into the sand trap zone of the processing tank.

The system may include a first linear shaker operatively positioned above the top of the vessel over the desanded mud zone of the processing tank.

The system may include a first hydrocyclone assembly operatively positioned above the first linear shaker. The first hydrocyclone assembly may be configured to receive a second fluid containing solids pumped from the degassed mud zone and to process the second fluid containing solids to partially separate solids from the fluid and to produce a first overflow fluid containing solids that is deposited into the desanded mud zone of the processing tank and a second underflow fluid containing solids that is deposited onto the first linear shaker for processing to partially separate solids from the fluid and to produce a third underflow fluid containing solids that is deposited into the desanded mud zone of the processing tank.

The system may include a second linear shaker operatively positioned above the top of the vessel partially over the desilted mud zone of the processing tank and partially over the overflow tank.

The system may include a second hydrocyclone assembly operatively positioned above the second linear shaker. The second hydrocyclone assembly may be configured to receive a third fluid containing solids pumped from the desanded mud zone of the processing tank and to process the third fluid containing solids to separate solids from the fluid and to produce an overflow fluid comprising the clean fluid substantially free of solids that is deposited into the overflow tank and a fourth underflow fluid containing solids that is deposited onto the second linear shaker for processing to separate solids from the fluid and to produce an underflow comprising the clean fluid substantially free of solids that is deposited into the overflow tank.

In another embodiment of the system, the first and second underflow baffles may be slanted in the direction towards the front sidewall of the vessel and the third baffle may be slanted in the direction towards the rear sidewall of the vessel.

In another embodiment of the system, the overflow tank may include an agitator to maintain fine solids in suspension within the clean fluid substantially free of solids contained within the overflow tank.

In another embodiment of the system, the overflow tank may include an outlet for flow of the clean fluid substantially free of solids from the overflow tank to a rig tank.

In another embodiment of the system, the first hydrocyclone assembly may include four 10 inch hydrocyclones equipped with 1 inch-2¼ inch apexes and the second hydrocyclone assembly includes fourteen 4 inch hydrocyclones equipped with 10 mm-30 mm inch apexes.

In another embodiment of the system, the system may further comprise a second scalping shaker operatively positioned above the top of the vessel over the sand trap zone of the processing tank. The second scalping shaker may be configured to receive the first fluid containing solids and to process the first fluid containing solids to partially separate solids from the fluid and to produce a fifth underflow fluid containing solids that is deposited into the sand trap zone of the processing tank.

In another embodiment of the system, the processing tank may further include a degasser suction zone defined by a pair of spaced apart baffles each operatively positioned transverse to the left and right sides of the vessel and extending from the top of the vessel to a point above the bottom of the vessel. The system may further comprise a degasser unit configured to receive a gas cut fluid suctioned from the degasser suction zone. The degasser unit processes the gas cut fluid to remove a gas from the gas cut fluid to produce a substantially gas free fluid that is deposited into the degassed mud zone of the processing tank. The system may also include an eductor configured to receive and pump a processed fluid from the desilted mud zone of the processing tank and to produce a suction force causing the degasser unit to receive the gas cut fluid from the degasser suction zone.

In another embodiment of the system, the system may further comprise a first perforated possum belly operatively positioned at the top of the vessel within the desanded mud zone of the processing tank. The first perforated possum belly may be configured to receive the first overflow fluid containing solids from the first hydrocyclone assembly and to uniformly distribute the first overflow containing solids within the desanded mud zone of the processing tank. The system may also include a second perforated possum belly operatively positioned at the top of the vessel within the degassed mud zone of the processing tank. The second perforated possum belly may be configured to receive the substantially gas free fluid from the degasser unit and to uniformly distribute the substantially gas free fluid within the degassed mud zone of the processing tank.

In yet another embodiment of the system, the system for separating solids from a fluid stream may comprise a frame assembly including a bottom skid frame and an upper platform interconnected by a plurality of vertical support posts. The system may include a containment vessel operatively supported by the bottom skid frame. The containment vessel may have a front sidewall, a rear sidewall, a left sidewall, and a right sidewall. The containment vessel may include an open top and a closed bottom. The containment vessel may be divided by an overflow weir into a processing tank and an overflow tank. The overflow weir may extend from the bottom of the vessel to the top of the vessel and may contain an opening so that a clean fluid substantially free of solids contained within the overflow tank may flow through the opening and into the processing tank. The processing tank may have a V-shape.

In this embodiment of the system, the processing tank may include a shaftless auger operatively positioned at the bottom of the vessel and extending substantially the entire length of the processing tank. The auger may be configured to rotate in a direction that transports solids collected at the bottom of the processing tank towards the front sidewall of the vessel. The processing tank may include a desilted mud zone defined by the overflow weir and a first underflow baffle operatively positioned transverse to the left and right sides of the vessel and extending from the top of the vessel to a point above the bottom of the vessel. The processing tank may include a desanded mud zone defined by the first underflow baffle and a second underflow baffle operatively positioned transverse to the left and right sides of the vessel and extending from the top of the vessel to a point above the bottom of the vessel. The processing tank may include a sand trap zone defined by the second under flow baffle and a third underflow baffle operatively positioned transverse to the left and right sides of the vessel and extending from the top of the vessel to a point above the bottom of the vessel. The processing tank may include a degassed mud zone defined by the third underflow baffle and the front sidewall of the vessel.

In this embodiment of the system, a first scalping shaker may be operatively supported by the upper platform. The first scalping shaker may be operatively positioned above the top of the vessel over the sand trap zone of the processing tank. The scalping shaker may be configured to receive a first fluid containing solids and to process the first fluid containing solids to partially separate solids from the fluid and to produce a first underflow fluid containing solids that is deposited into the sand trap zone of the processing tank.

In this embodiment of the system, a first linear shaker may be operatively supported by the upper platform. The first linear shaker may be operatively positioned above the top of the vessel over the desanded mud zone of the processing tank.

In this embodiment of the system, a first hydrocyclone assembly may be operatively positioned above the first linear shaker. The first hydrocyclone assembly may be configured to receive a second fluid containing solids pumped from the degassed mud zone and to process the second fluid containing solids to partially separate solids from the fluid and to produce a first overflow fluid containing solids that is deposited into the desanded mud zone of the processing tank and a second underflow fluid containing solids that is deposited onto the first linear shaker for processing to partially separate solids from the fluid and to produce a third underflow fluid containing solids that is deposited into the desanded mud zone of the processing tank.

In this embodiment of the system, a second linear shaker may be operatively supported by the upper platform. The second linear shaker may be operatively positioned above the top of the vessel partially over the desilted mud zone of the processing tank and partially over the overflow tank.

In this embodiment of the system, a second hydrocyclone assembly may be operatively positioned above the second linear shaker. The second hydrocyclone assembly may be configured to receive a third fluid containing solids pumped from the desanded zone of the processing tank and to process the third fluid containing solids to separate solids from the fluid and to produce an overflow fluid comprising the clean fluid substantially free of solids that is deposited into the overflow tank and a fourth underflow fluid containing solids that is deposited onto the second linear shaker for processing to separate solids from the fluid and to produce an underflow comprising the clean fluid substantially free of solids that is deposited into the overflow tank.

In yet another embodiment of this system, the system may further comprise a second scalping shaker operatively supported by the upper platform. The second scalping shaker may be operatively positioned above the top of the vessel over the sand trap zone of the processing tank. The second scalping shaker may be configured to receive the first fluid containing solids and to process the first fluid containing solids to partially separate solids from the fluid and to produce a fifth underflow fluid containing solids that is deposited into the sand trap zone of the processing tank.

In yet another embodiment of this system, the processing tank may further include a degasser suction zone defined by a pair of spaced apart baffles each operatively positioned transverse to the left and right sides of the vessel and extending from the top of the vessel to a point above the bottom of the vessel. This system may further comprise a degasser unit operatively supported by the upper platform. The degasser unit may be configured to receive a gas cut fluid suctioned from the degasser suction zone. The degasser unit may process the gas cut fluid to remove a gas from the gas cut fluid to produce a substantially gas free fluid. This system may also include an eductor configured to receive and pump a processed fluid from the desilted mud zone of the processing tank and to produce a suction force causing the degasser unit to receive the gas cut fluid from the degasser suction zone.

In yet another embodiment of this system, the system may further comprise a first perforated possum belly operatively positioned at the top of the vessel within the desanded mud zone of the processing tank. The first perforated possum belly may be configured to receive the first overflow fluid containing solids from the first hydrocyclone assembly and to uniformly distribute the first overflow containing solids within the desanded mud zone of the processing tank. This embodiment may also include a second perforated possum belly operatively positioned at the top of the vessel within the degassed mud zone of the processing tank. The second perforated possum belly may be configured to receive the substantially gas free fluid from the degasser unit and to uniformly distribute the substantially gas free fluid within the degassed mud zone of the processing tank.

In yet another embodiment of this system, the system may further comprise a stair assembly operatively connected to the upper platform to provide an operator access to the upper platform.

In yet another embodiment of this system, the system may further comprise a railing substantially extending around a periphery of the upper platform.

In yet another embodiment of this system, the system may further comprise a roof operatively connected to the upper platform by a plurality of vertical support posts. The roof may be configured to be detachable from the upper platform.

In yet another embodiment of this system, the vertical support posts connecting the roof to the upper platform are configured to be telescoping to permit the raising and lower of the vertical support posts relative to the upper platform.

In yet another embodiment of this system, the system may further comprise a control room containing equipment to operate the containment vessel, the scalping shaker, the first linear shaker, the first hydrocyclone assembly, the second linear shaker, the second hydrocyclone assembly, or any combination thereof.

In yet another embodiment of this system, the system may further comprise a monitoring station positioned on the upper platform containing a display screen to operate or monitor the functioning of the system.

In yet another embodiment of this system, the upper platform may comprise a plurality of individual platforms and wherein the scalping shaker, the first linear shaker, and the second linear shaker are each supported by one of the plurality of individual platforms.

The present invention is also drawn to a method of separating solids from a fluid stream. The method may comprise the step of providing an embodiment of the solids separation system as described above. The method may include the step of rotating the shaftless auger to transport the solids collected at the bottom of the processing tank towards to the front sidewall of the vessel. The method may include the step of receiving the first fluid containing solids in the scalping shaker. The method may include the step of causing the scalping shaker to process the first fluid containing solids to partially separate solids from the fluid and to produce the first underflow fluid containing solids. The method may include the step of depositing the first underflow fluid containing solids into the sand trap zone of the processing tank. The method may include the step of pumping the second fluid containing solids from the degassed mud zone to the first hydrocyclone assembly. The method may include the step of causing the first hydrocyclone assembly to process the second fluid containing solids to partially separate solids from the fluid and to produce the first overflow containing solids and the second underflow fluid containing solids. The method may include the step of depositing the first overflow containing solids into the desanded mud zone of the processing tank. The method may include the step of depositing the second underflow fluid containing solids onto the first linear shaker. The method may include the step of causing the first linear shaker to process the second underflow fluid containing solids to partially separate solids from the fluid and to produce a third underflow fluid containing solids. The method may include the step of depositing the third underflow fluid containing solids into the desanded mud zone. The method may include the step of pumping the third fluid containing solids from the desanded mud zone of the processing tank to the second hydrocyclone assembly. The method may include the step of causing the second hydrocyclone assembly to process the third fluid containing solids to separate solids from the fluid and to produce the overflow fluid comprising the clean fluid substantially free of solids and the fourth underflow fluid containing solids. The method may include the step of depositing the overflow fluid comprising the clean fluid substantially free of solids into the overflow tank. The method may include the step of depositing the fourth underflow fluid containing solids onto the second linear shaker. The method may include the step of causing the second linear shaker to process the fourth underflow fluid containing solids to separate solids from the fluid and to the underflow fluid comprising the clean fluid substantially free of solids. The method may include the step of depositing the underflow fluid comprising the clean fluid substantially free of solids into the overflow tank.

In another embodiment of the method, the overflow tank includes an agitator and the method may further comprise the step of activating the agitator to maintain finer solids in suspension within the clean fluid substantially free of solids contained within the overflow tank.

In another embodiment of the method, the overflow tank includes an outlet and the method may further comprise the step of flowing the clean fluid substantially free of solids contained within the overflow tank through the outlet and to a rig tank.

In another embodiment of the method, the solids separation system further comprises a second scalping shaker operatively positioned above the top of the vessel over the sand trap zone of the processing tank, the second scalping shaker configured to receive the first fluid containing solids and to process the first fluid containing solids to partially separate solids from the fluid and to produce a fifth underflow fluid containing solids that is deposited into the sand trap zone of the processing tank, the method may further comprise the steps of: receiving the first fluid containing solids in the second scalping shaker; causing the second scalping shaker to process the first fluid containing solids to partially separate solids from the fluid and to produce the fifth underflow fluid containing solids; depositing the fifth underflow fluid containing solids into the sand trap zone of the processing tank.

In another embodiment of the method, the first fluid containing solids comprises a gas cut fluid and wherein the processing tank further includes a degasser suction zone defined by a pair of spaced apart baffles each operatively positioned transverse to the left and right sides of the vessel and extending from the top of the vessel to a point above the bottom of the vessel, and the solids separation system further comprises: a degasser unit configured to receive the gas cut fluid suctioned from the degasser suction zone, the degasser unit processing the gas cut fluid to remove a gas from the gas cut fluid to produce a substantially gas free fluid that is deposited into the degassed mud zone of the processing tank; an eductor configured to receive and pump a processed fluid from the desilted mud zone of the processing tank and to produce a suction force causing the degasser unit to receive the gas cut fluid from the degasser suction zone, the method may further comprise the steps of: pumping the processed fluid from the desilted mud zone of the processing tank to the eductor; causing the eductor to produce a suction force that causes the degasser unit to receive the gas cut fluid from the degasser suction zone of the processing tank; processing the gas cut fluid within the degasser unit to produce a substantially gas free fluid; pumping the substantially gas free fluid from the degasser unit to the degassed mud zone of the processing tank.

DETAILED DESCRIPTION OF THE INVENTION

Figure 1:
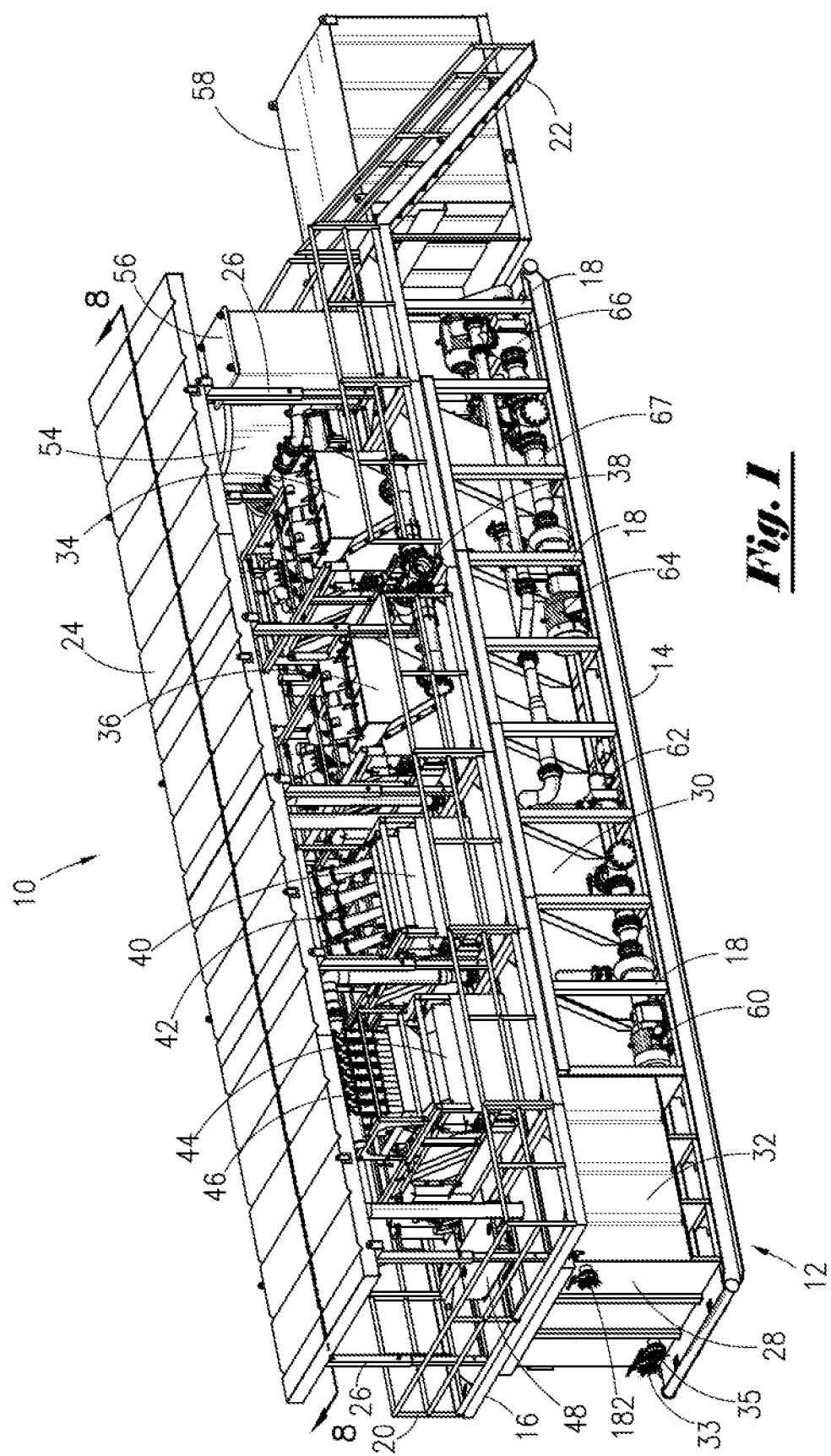
FIG. 1 is a perspective left side view of the system.

With reference to the figures where like elements have been given like numerical designation to facilitate an understanding of the invention, and particularly with reference to the embodiment of the invention illustrated in FIGS. 1-4, system 10 may include frame assembly 12 supporting the components of system 10. Frame assembly 12 may include bottom skid frame 14 and upper platform 16 that are interconnected by a series of vertical support posts 18 on the left and right sides of frame assembly 12. Bottom skid frame 14 provides support for system 10 when positioned on the ground surface or other surface (e.g. trailer bed surface of a truck when system 10 is being transported to or from a work site). Upper platform 16 may include railing 20 extending substantially around the outer periphery thereof for safety of personnel accessing upper platform 16. Stair assembly 22 may be detachably affixed to the front end of upper platform 16 to provide a means for personnel to gain access to upper platform 16. One embodiment of frame assembly 12 has an open top. Another embodiment, as shown in FIG. 1, includes roof 24 that provides protection from the elements (e.g. rain) for the equipment of system 10 and the personnel operating the equipment. Roof 24 further keeps rain from mixing with oil based mud processed in system 10. Roof 24 may be affixed to upper platform 16 by a series of vertical supports posts 26 interconnecting roof 24 to upper platform 16. Roof 24 may be detachable from upper platform 16 so that it may be disconnected from frame assembly 12 during transport of system 10 and detachably connected to upper platform 16 when system 10 is positioned at the job site for operational use. Vertical support posts 26 may be telescoping so that roof 24 may be raised and lowered relative to upper platform 16. Vertical support posts 26 may be raised for its operational position and lowered for transport of system 10. Frame assembly 12 may be constructed of any durable material such as metal (e.g. steel). The component parts of frame assembly 12 (e.g. bottom skid frame 14, vertical support posts 18, upper platform 16, vertical support posts 26, roof 24, and stair assembly 22) may be connected together and to each other by any suitable means, as for example, welding or assembling by bolts, nuts, screws, rivets, or the like.

With further reference to FIGS. 1-4, system 10 may include containment vessel 28 supported in and by bottom skid frame 14. Containment vessel 28 may include longitudinally extending processing tank 30 (which may be V-shaped) in fluid communication with agitated overflow tank 32 (which may be rectangularly shaped). Processing tank 30 and overflow tank 32 may each have an open top configured to receive underflow from one or more shakers operationally positioned above processing tank 30 and overflow tank 32. Processing tank 30 may hold a fluid volume of about 217 bbl with the fluid level about 12 inches from top 112 of tank 30. Overflow tank 32 may hold a fluid volume of about 102 bbl with the fluid level about 12 inches from top 112 of tank 32. The dimensions of vessel 28 may varying depending on operational parameters and location (e.g. land versus offshore application). As an example, vessel 28 may have a height of about 8 feet, a length of about 48 feet, and a width at top 112 of about 10 feet. Vessel 28 is configured to be transported to and from a work site, by, for example, being hauled on a flatbed trailer. Vessel 28 may be constructed of any durable material such as metal (steel) or hardened plastic or polymer material.

Also seen in FIGS. 1-4, system 10 may incorporate shakers 34, 36 in operative position above the forward section of tank 30. Shakers 34, 36 are supported above the forward section of tank 30 by upper platform 16. Shakers 34, 36 may be scalping shakers configured to receive drilling mud either directly from a drilling rig or from a storage tank through flowline inlet 38. Shakers 34, 36 may each have approximately 50 ft.$^2$ of screening area and may be equipped with 0.65 mm polyurethane screen panels. Shakers 34, 36 are commercially available from DEL Corporation under the trade name DELineator 5000 Scalping Shakers.

As also seen in FIGS. 1-4, system 10 may include shaker 40 supported by and operatively positioned on upper platform 16 above the rearward section of tank 30. Shaker 40 may be a linear shaker. Shaker 40 may have about 50 ft.$^2$ of screening area and may be equipped one or more screen panels sized with 1 to 400 mesh screens. Shaker 40 is commercially available from DEL Corporation under the trade name DELineator 5000 Linear Shaker. System 10 may also include hydrocyclone assembly 42 operatively positioned above and associated with shaker 40 so that the underflow from hydrocyclone assembly 42 discharges onto shaker 40. Hydrocyclone assembly 42 may include four 10 inch gMAX hydrocyclones equipped with 1 inch-2¼ inch apexes. Hydrocyclone assembly 42 is commercially available from Krebs Engineering, Inc.

Again with reference to FIGS. 1-4, system 10 may also include shaker 44 supported by and operatively positioned on upper platform 16 partially above the rearward section of processing tank 30 and the forward section of overflow tank 32. Shaker 44 may be a linear shaker. Shaker 44 may have about 50 ft.$^2$ of screening area and may be equipped one or more screen panels sized with 1 to 400 mesh screens. Shaker 44 is commercially available from DEL Corporation under the trade name DELineator 5000 Linear Shaker. System 10 may also include hydrocyclone assembly 46 operatively positioned above and associated with shaker 44 so that the underflow from hydrocyclone assembly 46 discharges onto shaker 44. Hydrocyclone assembly 46 may include fourteen 4 inch CAVEX 100 CVX hydrocyclones equipped with 10 mm-30 mm apexes. Hydrocyclone assembly 42 is commercially available from The Weir Group.

With further reference to FIGS. 1-4, system 10 may include agitator unit 48 operatively positioned at the rearward section of upper platform 16. Agitator unit 48 operates to rotate agitator 50 (blade and shaft) that extends into internal area 52 of overflow tank 32 (see FIG. 8). Agitator 50 rotates to keep any fine solids in suspension within the clean fluid contained within overflow tank 32.

FIGS. 1-4 also depict that system 10 may include centrifuge suction outlet 33 and spray bar pump suction outlet 35 at rearward side 100 of containment vessel 28, and more specifically, in overflow tank 32. Overflow tank 32 may also include overflow outlet 182. While overflow outlet 182 is shown on the rearward side 100 of vessel 28, it is to be understood that overflow outlet 182 may be placed in any location on overflow tank 32, and more particularly, at or near top 112.

As also seen in FIGS. 1-4, system 10 may include vacuum degasser unit 54 positioned on and supported by upper platform 16 at its forward end. Degasser unit 54 is commercially available from Process Solutions International (PSI) under the trade name Vacuum Degasser. System 10 may also include monitoring station 56 also positioned on and supported by upper platform 16 at its forward end. Monitoring station 56 may contain instrumentation and electronics for operating system 10 or for monitoring the operation of system 10. For example, monitoring station 56 may contain one or more touch screen panels for displaying data relating to the operation of equipment and processing of fluid by system 10. System 10 may also include control room 58 that is operatively associated with all mechanical and electrical equipment responsible for processing fluid and removing solids as part of the operation of system 10. Control room 58 may contain VFD breaker panels and starter boxes. Control room 58 may also contain computers and other similar type of equipment configured to operate the mechanical and electrical equipment associated with system 10.

As illustrated in FIG. 1, system 10 may include desilter pump 60. Desilter pump 60 may generate a maximum flow rate of about 1200 gpm. Desilter pump 60 is commercially available from PSI under trade name Centrifugal Pump. System 10 may also include spray bar pump 62. Spray bar pump 62 may generate a maximum flow rate of about 300 gpm. Spray bar pump 62 is commercially available from PSI under trade name Centrifugal Pump. System 10 may also include primary desander pump 64. Primary desander pump 64 may generate a maximum flow rate of about 1800 gpm. Primary desander pump 64 is commercially available from PSI under trade name Centrifugal Pump. System 10 may also include standby desander pump 66, which functions as a backup should primary desander pump 64 become non-operational. Pipe 67 fluidly interconnects primary desander pump 64 and standby desander pump 66. Standby desander pump 66 may generate a maximum flow rate of about 1800 gpm. Standby desander pump 66 is commercially available from PSI under trade name Centrifugal Pump.

Figure 2:
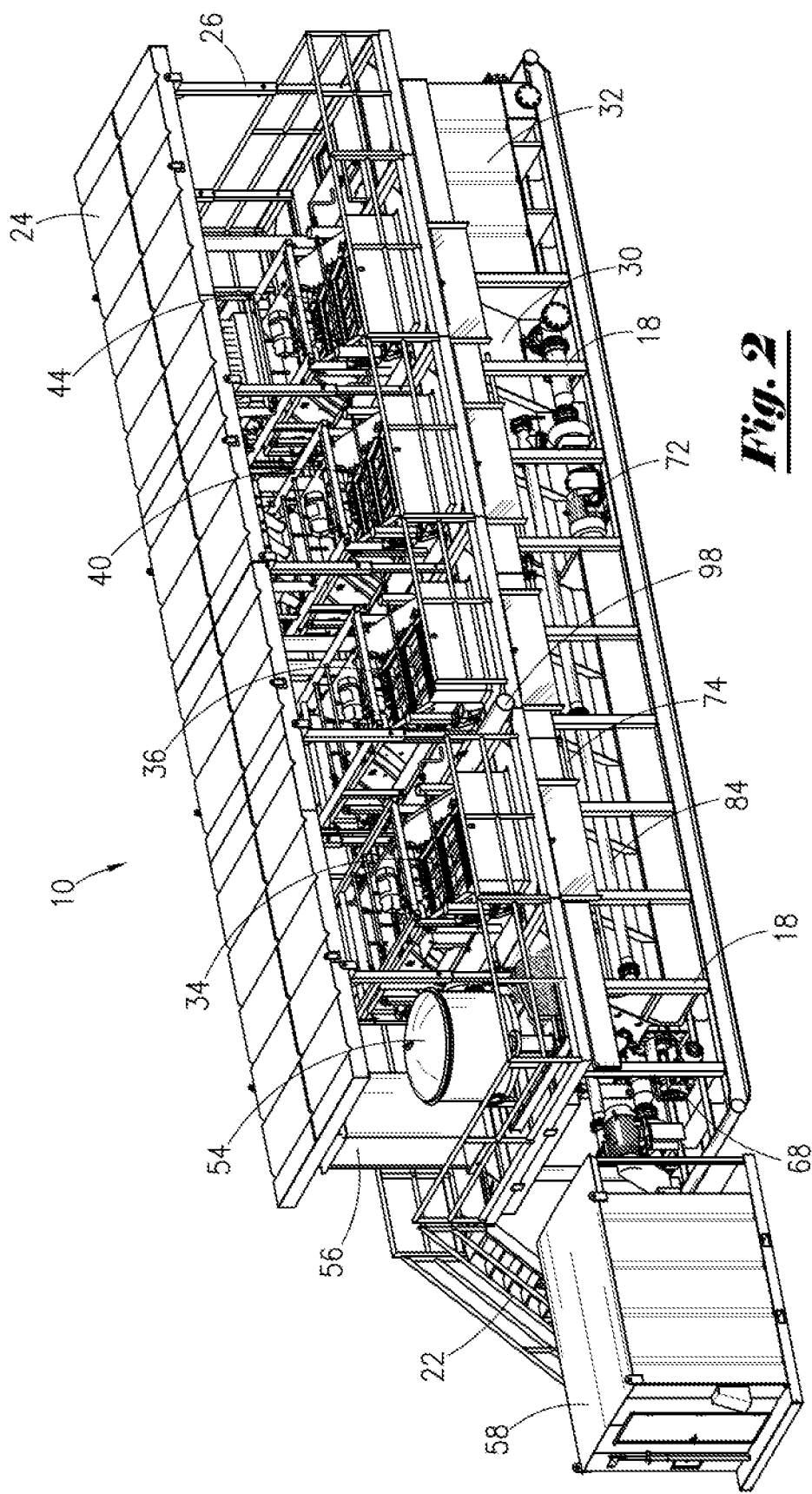
FIG. 2 is a perspective right side view of the system.
Figure 6:
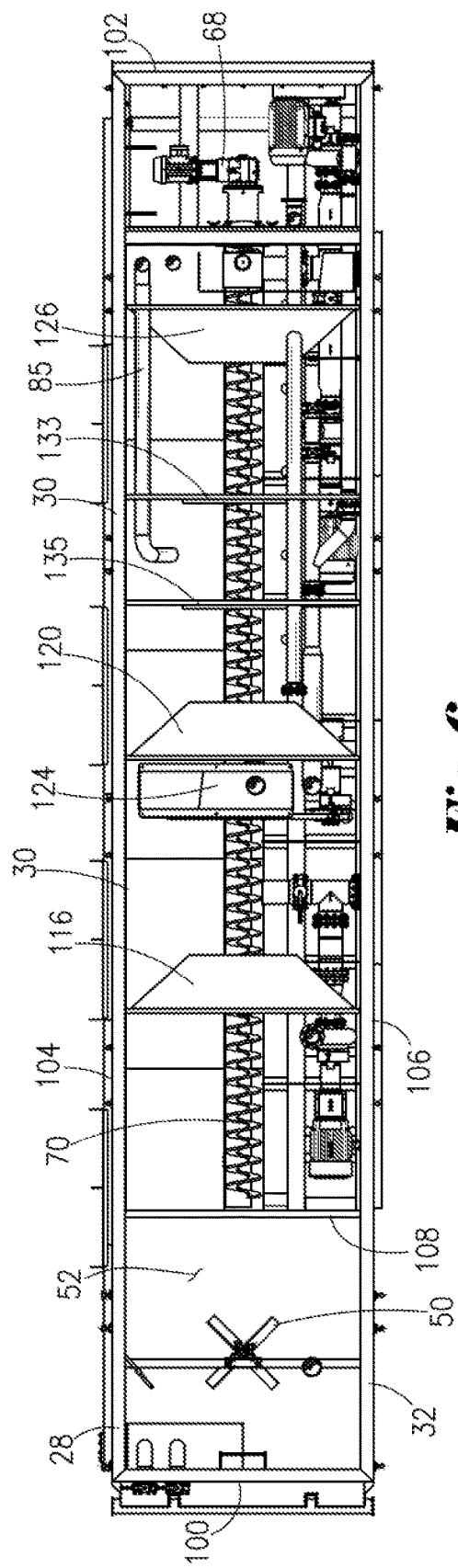
FIG. 6 is a partial cross-sectional top view of the system taken along lines 6-6 of FIG. 3.
Figure 7:
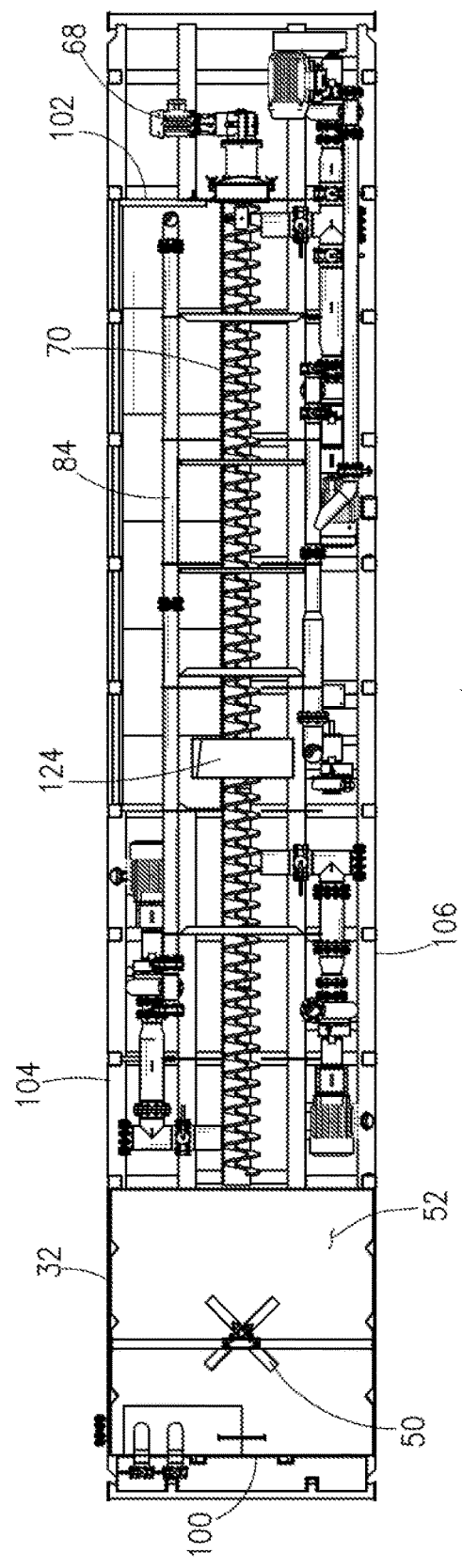
FIG. 7 is a partial cross-sectional top view of the system taken along lines 7-7 of FIG. 3.

FIG. 2 shows auger drive unit 68 that functions to operate and rotate shaftless auger 70 that is shown in FIGS. 6-7. Auger drive unit 68 (which has a shaft operatively connected to auger 70) operates at range of 0 to 25 rpms. Auger drive unit 68 is commercially available from SEW Eurodrive (the gear reducer component) and from Weg Electric Corporation (the electrical motor component). Auger 70 is commercially available from Falcon Industries, Inc. under the trade name Shaftless Screw Conveyor.

FIG. 2 also shows degasser/gun line pump 72. Degasser/gun line pump 72 may generate a maximum flow rate of about 1000 gpm. Degasser/gun line pump 72 is commercially available from PSI under trade name Centrifugal Pump.

FIG. 2 also reveals that system 10 may include spray bar manifold 74 that is in fluid communication with spray bar pump 62 to distribute clean fluid from overflow tank 32 to spray bar 154 operatively associated in the bed of each of shakers 34, 36, 40, 44 as will be described herein. Spray bar manifold 74 is also in fluid communication with one or more spray bars (not shown) operatively connected to a spray bar rack (not shown) comprising the upper frame of each of shakers 34, 36, 40, 44, which contain downward extending nozzles that spray clean fluid delivered from overflow tank 32 onto the shaker screens. A flow line (not shown) extending from each of the spray bar racks may connect to spray bar manifold 74 to provide the clean fluid to the spray bar racks. Each spray bar rack may contain a flow line operatively connected to respective spray bars 154 that flows the clean fluid from the spray bar rack to spray bar 154.

Figure 3:
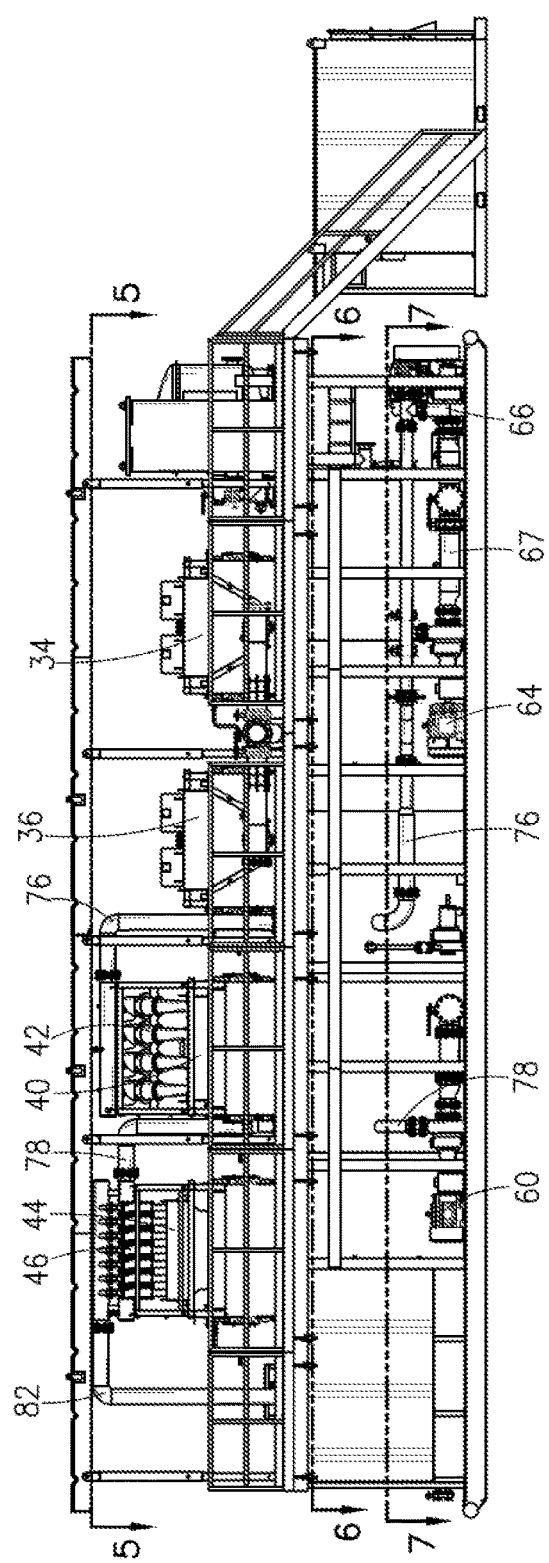
FIG. 3 is a left side view of the system.

With reference to FIG. 3, primary desander pump 64 may be in fluid communication with hydrocyclone assembly 42 through pipe 76. Desilter pump 60 may be in fluid communication with hydrocyclone assembly 46 through pipe 78.

Figure 4:
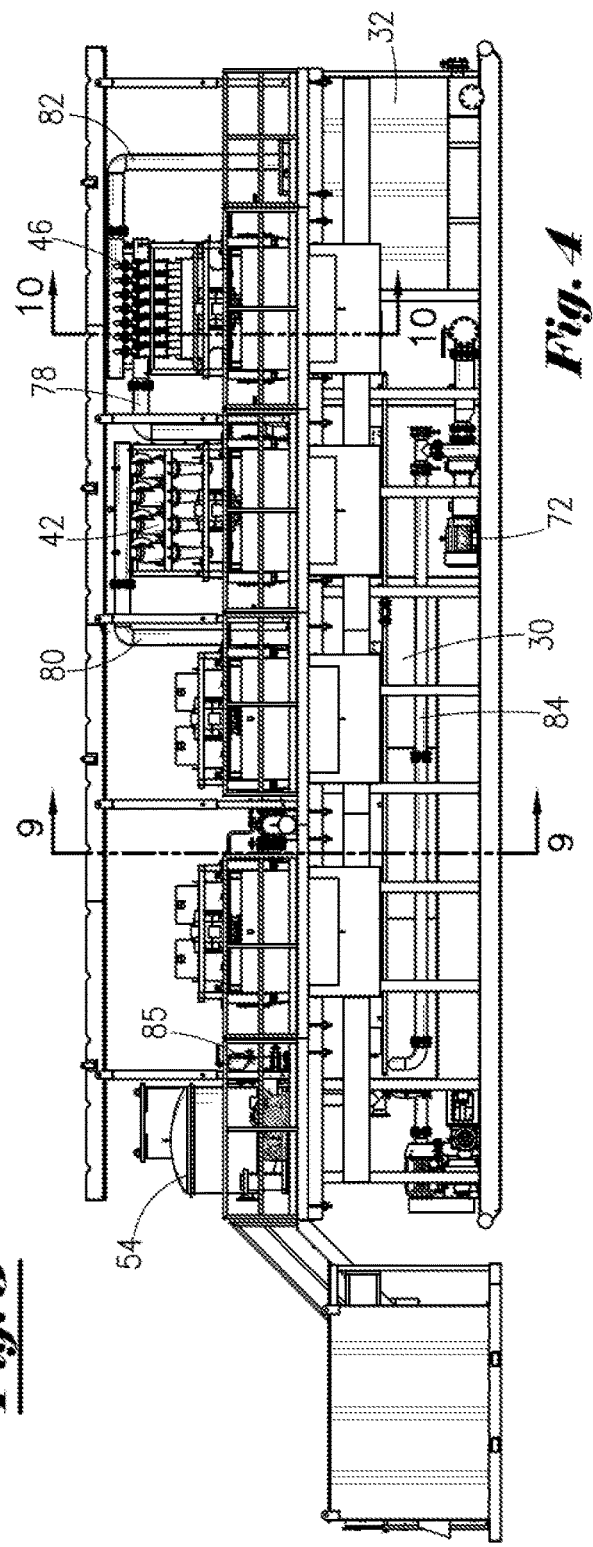
FIG. 4 is a right side view of the system.
Figure 5:
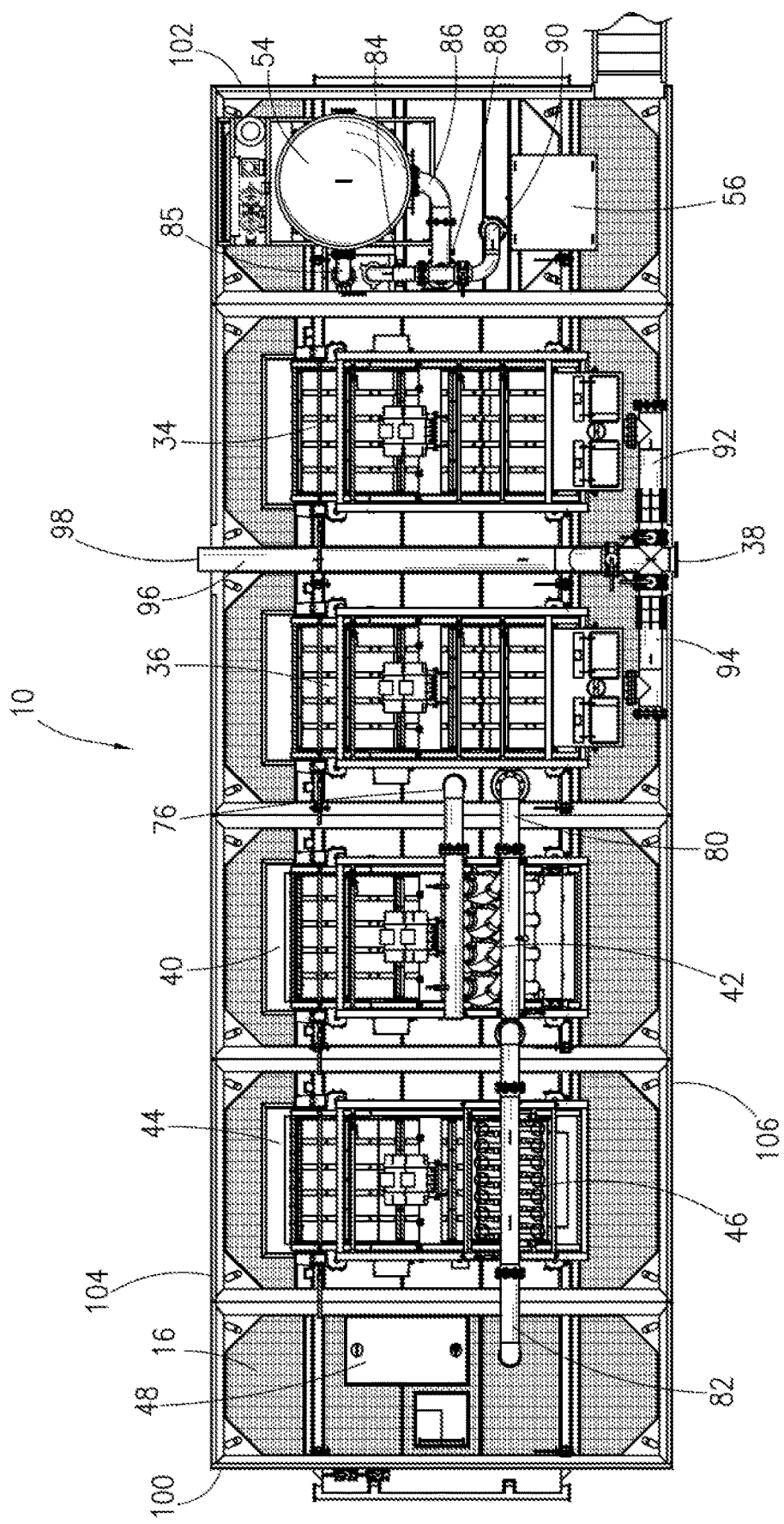
FIG. 5 is a partial cross-sectional top view of the system taken along lines 5-5 of FIG. 3.

FIG. 4 shows that the overflow from hydrocyclone assembly 42 is in fluid communication with tank 30 through pipe 80 that deposits the overflow into possum belly 124. The overflow from hydrocyclone assembly 46 is in fluid communication with overflow tank 32 through pipe 82. Degasser/gun line pump 72 may be in fluid communication with eductor 88 (as seen in FIG. 5) through pipe 84. Eductor 88 is a jet pump. Eductor 88 is commercially available from PSI and constitutes part of the degasser unit package.

As seen in FIG. 5, fluid pumped through pipe 84 to eductor 88 causes eductor 88 to produce a Venturi effect, which in turn causes the suctioning of fluid (gas cut mud) from processing tank 30 (at degasser suction zone 135 as will be explained herein) through pipe 85 to degasser unit 54. Fluid processed in degasser unit 54 (mud substantially free of gas) flows from unit 54 through pipe 86 to possum belly 132 for deposit into degassed mud zone 130. Pipe 84 may be fluidly connected to gunline 90, which may return fluid pumped by degasser/gunline pump 72 through pipe 84 back into processing tank 30 (for deposit in sand trap zone 128) through gunline 90.

Again with reference to FIG. 5, flow line inlet 38 leads to pipe 92 that provides fluid communication to shaker 34. Flow line inlet 38 also leads to pipe 94 that provides fluid communication to shaker 36. Fluid entering inlet 38 may bypass shakers 34, 36 though bypass pipe 96 which leads to outlet 98. Bypass pipe 96 may be used when the fluid entering inlet 38 is cement that does not need to undergo processing to remove solids entrained therein. In this instance, a pipe (not shown) to recover the cement would be affixed to outlet 98 to transport the cement to a cement storage tank or earthen pit (not shown).

Fluids containing solids (such as drilling mud) entering system 10 through flow line inlet 38 may selectively be flowed to either of shakers 34, 36 or both of shakers 34, 36.

The selective flow pattern may be controlled by valves contained within pipes 92, 94, 96. When it is desired for the fluid/solids to flow through one or both shakers 34, 36, a valve in bypass pipe 96 is actuated to close off fluid entry into pipe 96. Valves within each of pipes 92, 94 may be selectively actuated to close off or open fluid flow therethrough so that fluid/solids may be directed to either one or both of shakers 34, 36. To direct the fluid/solids flow through bypass pipe 96, valves in pipes 92, 94 are actuated to close off entry and the valve in bypass pipe 96 is actuated to the open position to permit fluid flow therethrough to outlet 98. The valves may be any suitable valve such as a butterfly valve or a gate valve. The actuation of the valves may be controlled by the operator of system 10 from monitoring station 56 and/or control room 58.

FIGS. 6-9 illustrate that containment vessel 28 may include rearward side 100, frontward side 102, right side 104, and left side 106. Internal area 52 of overflow tank 32 is defined by inner surfaces of rearward side 100, right side 104, left side 106, and overflow weir 108, which is operatively positioned transverse to right and left sides 104, 106 and extends vertically from bottom 110 of processing tank 30 to top 112, or in one embodiment described below, to a point below top 112. Overflow weir 108 may contain an opening that permits clean fluid in overflow tank 32 to flow back into processing tank 30 at desilted mud zone 118. The opening may be configured in any suitable design. For example, the opening may be configured partially or completely along the upper edge to overflow weir 108. In this embodiment, overflow weir 108 extends vertically from bottom 110 of processing tank 30 to a point about 6 to 12 inches below top 112. In another embodiment (shown in FIG. 10), the opening may be configured as window 190. Window 190 have a dimension of about 24" by 16" and start about 8" the top edge of overflow weir 108. Window 190 may be placed in the upper section of overflow weir 108 and positioned on either the left or right side. Internal area 114 of processing tank 30 is defined by overflow weir 108 and the inner surfaces of right side 104, left side 106, and frontward side 102.

As shown in FIGS. 6-9, right and left sides 104, 106 of tank 30 may be tapered in the direction towards bottom 110 so as to facilitate the deposit of solids within the fluid contained in internal area 114 to separate and fall by gravity to bottom 110. The taper angle of right and left sides 104, 106 of tank 30 may be in the range of 50 degrees to 60 degrees relative to the horizontal ground or bottom 110. Shaftless auger 70 is operatively positioned at bottom 110 of tank 30 and extends substantially longitudinally along the length of tank 30 from overflow weir 108 to frontward side 102.

FIGS. 6-9 also reveal that internal area 114 of processing tank 30 may include underflow baffle 116 operatively positioned transverse to right and left sides 104, 106 and extends vertically from its proximal end at top 112 downward towards bottom 110. The distal end of underflow baffle 116 terminates above bottom 110 by about 3 feet. Underflow baffle 116 may be slanted in the direction of frontward side 102 at an angle in the range of 55 degrees to 60 degrees. Internal area 114 defined by overflow weir 108, right and left sides 104, 106, and underflow baffle 116 form desilted mud zone 118.

Again with reference to FIGS. 6-9, internal area 114 of processing tank 30 may include underflow baffle 120 operatively positioned transverse to right and left sides 104, 106 and extends vertically from its proximal end at top 112 downwards towards bottom 110. The distal end of underflow baffle 120 terminates above bottom 110 by about 3 feet. Underflow baffle 120 may be slanted in the direction of frontward side 102 at an angle in the range of 55 degrees to 60 degrees. Internal area 114 defined by baffle 116, right and left sides 104, 106, and underflow baffle 120 form desanded mud zone 122. Perforated possum belly 124 may be operatively positioned adjacent underflow baffle 120 and within desanded mud zone 122 at top 112 to uniformly distribute the desanded mud (as will be explained herein) into desanded mud zone 122. Perforated possum belly 124 is commercially available from DEL Corp. under the trade name Perforated Possum Belly.

FIGS. 6-9 further illustrate that internal area 114 of processing tank 30 may include underflow baffle 126 operatively positioned transverse to right and left sides 104, 106 and extends vertically from its proximal end at top 112 downwards towards bottom 110. The distal end of underflow baffle 126 terminates above bottom 110 by about 3 feet. Underflow baffle 126 may be slanted in the direction of rearward side 100 at angle in the range of 55 degrees to 60 degrees. Internal area 114 defined by baffle 120, right and left sides 104, 106 and baffle 126 form sand trap zone 128.

FIGS. 6-9 also demonstrate that internal area 114 of processing tank 30 defined by baffle 126, right and left sides 104, 106 and frontward side 102 form degassed mud zone 130. Perforated possum belly 132 may be operatively positioned between baffle 126 and frontward side 102 within degassed mud zone 130 at top 112 to uniformly distribute the degassed mud (as will be explained herein) into degassed mud zone 130. Perforated possum belly 132 is commercially available from DEL Corp. under the trade name Perforated Possum Belly.

Figure 8:
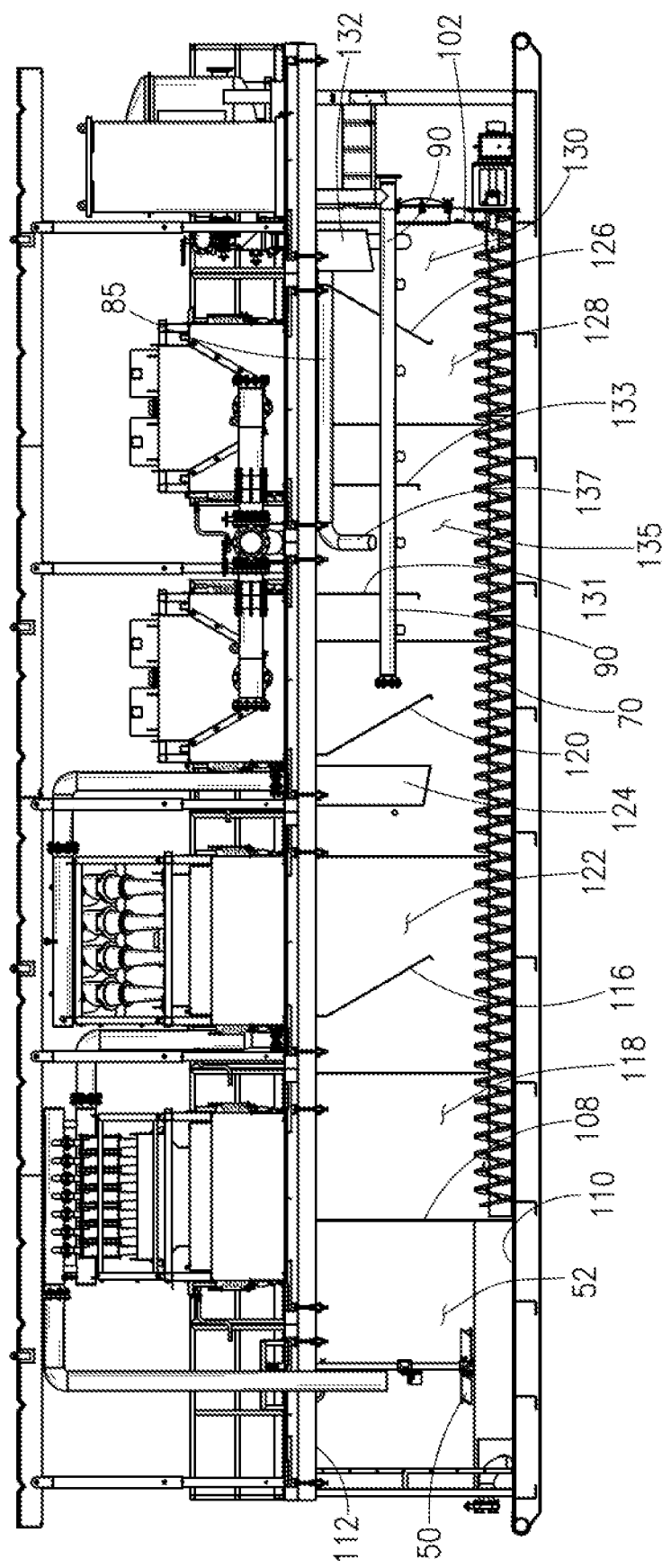
FIG. 8 is a partial cross-sectional side view of the system taken along lines 8-8 of FIG. 1.
Figure 9:
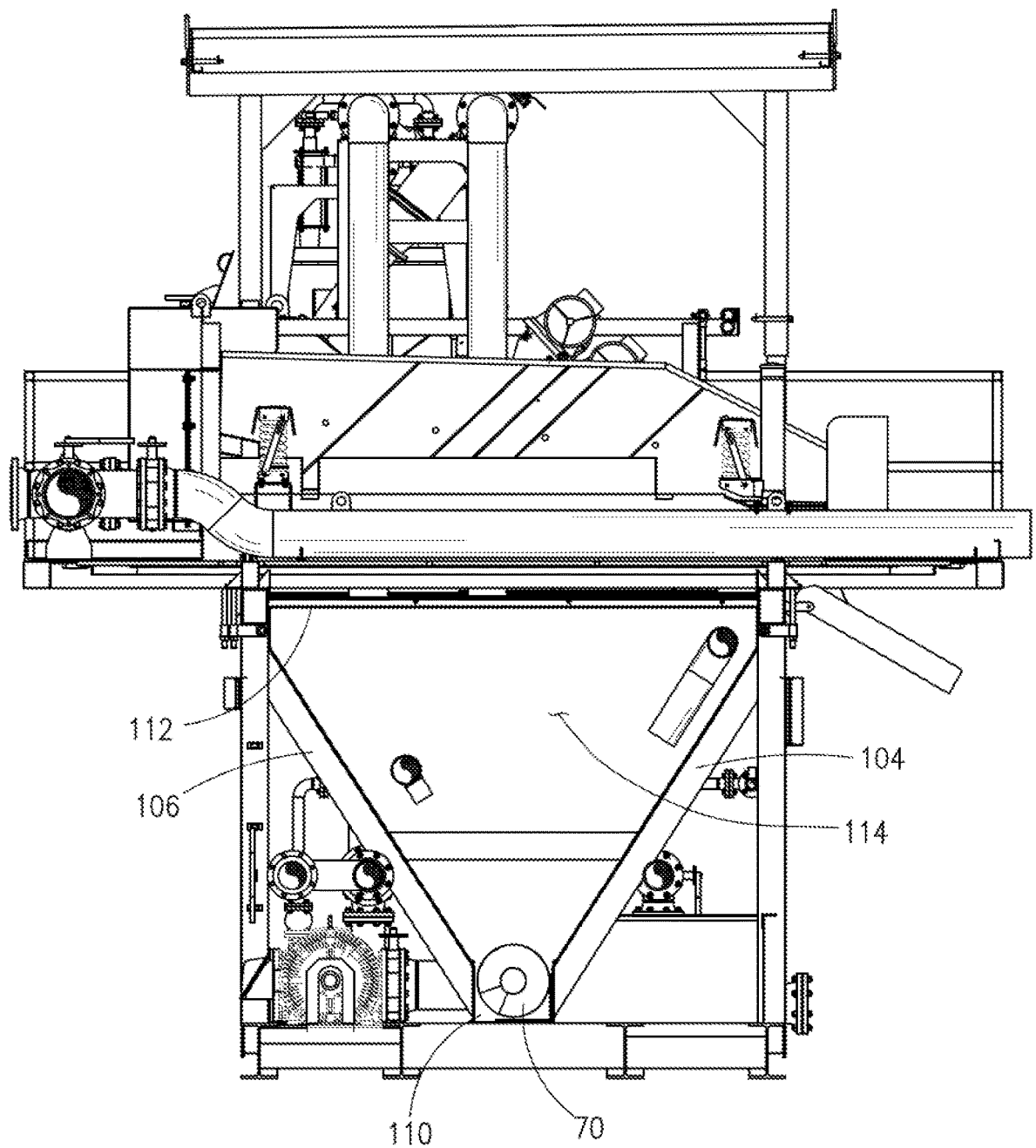
FIG. 9 is a front view of the system.

FIGS. 6-9 also show a pair of underflow baffles 131, 133 in spaced apart arrangement within sand trap zone 128. Each of underflow baffles 131, 133 is operatively positioned transverse to right and left sides 104, 106 and extends vertically from its proximal end at top 112 downwards towards bottom 110. Each of underflow baffles 131, 133 terminates above bottom 110 by about 3.5 feet. Each of underflow baffles 131, 133 is substantially perpendicular to bottom 110. Internal area 135 defined by underflow baffle 131, right and left sides 104, 106, and underflow baffle 133 forms degasser suction zone 135. As seen in FIG. 8, suction pipe 85 contains an inlet 137 operatively positioned within degasser suction zone 135. Fluid contained within degasser suction zone 135 may be suctioned through pipe 85 to degasser unit 54 as will be described herein. All baffles used in tank 30 may be made of any durable material such as metal (steel) or a hardened plastic or polymer material.

Figure 10:
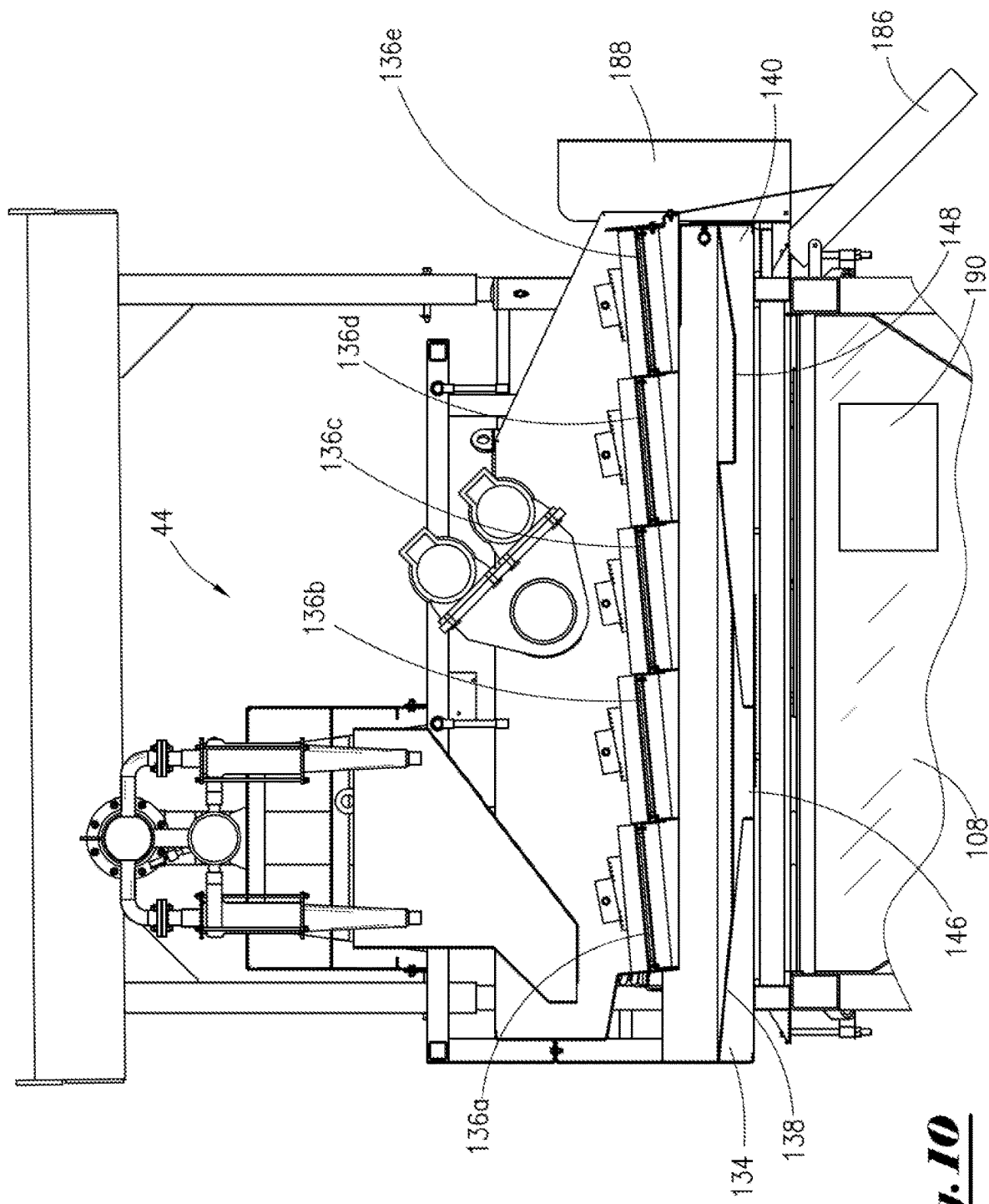
FIG. 10 is a partial cross-sectional view of a linear shaker.

FIGS. 10 and 11A-11D depict linear shaker 44. Shaker 44 may include bed 134. Bed 134 receives the underflow fluid or mud from the shaker screen. The shaker screen may include one or more screens that are sized to permit fluid to drain below the screen or screens (the underflow) and solids to remain on the screen or screens where they dry and are conveyed across the screen or screens to chute 188, which when extended, will direct the solids from vessel 28 and into a cuttings tank (not shown). FIG. 10 shows shaker 44 containing five screens 136a, 136b, 136c, 136d, 136e. It is to be understood that shaker 44 could have multiple screens having the same or different mesh sizes so as to separate or remove different sized solid particles. For example, screens 136a-136d may each have a mesh size of API 200 (62-89 microns) and screen 136e may have a mesh size of API 140 (105-115 microns).

Again with reference to FIGS. 10 and 11A-11D, shaker bed 134 may contain bottom 156 and interconnecting sidewalls 158, 160, 162, 164. Bottom 156 of shaker bed 134 may be contoured so as to direct the underflow from screens 136a-136e (fluid or mud) to one or more outlets. Bottom 156 may be contoured into two sections 138 and 140. Section 138 captures the underflow from the finer mesh sized screens and directs the underflow to an outlet that deposits the underflow into internal area 52 of overflow 32. For example, section 138 may include tapered portions 142a, 142b, 142c configured to direct the underflow from screens 136a-136d to outlet 146 that deposits the underflow into internal area 52 of overflow tank 32. Section 140 captures the underflow from the coarser mesh sized screen(s) and directs the underflow to an outlet that deposits the underflow into desilted mud zone 118 of processing tank 30. For example, section 140 may include tapered portions 144a, 144b (partitioned from section 138 by shoulder 150) configured to direct the underflow from screen 136e to outlet 148 that deposits the underflow into desilted mud zone 118 of processing tank 30.

Figure 11A:
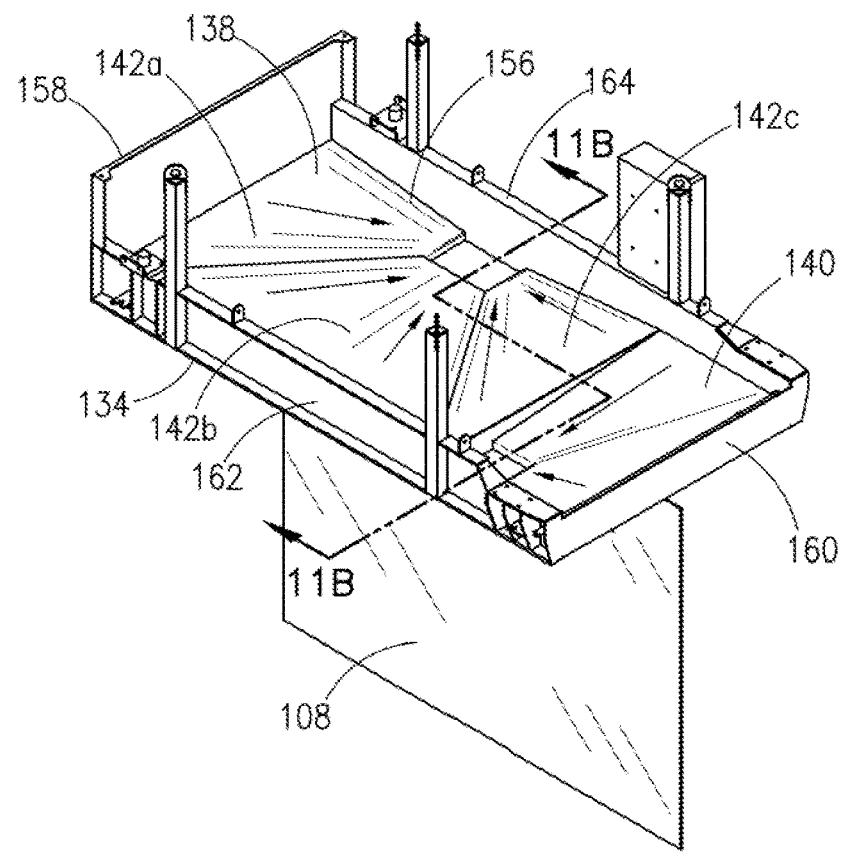
FIG. 11A is a left-side perspective view of a linear shaker bed positioned above the overflow weir.
Figure 11B:
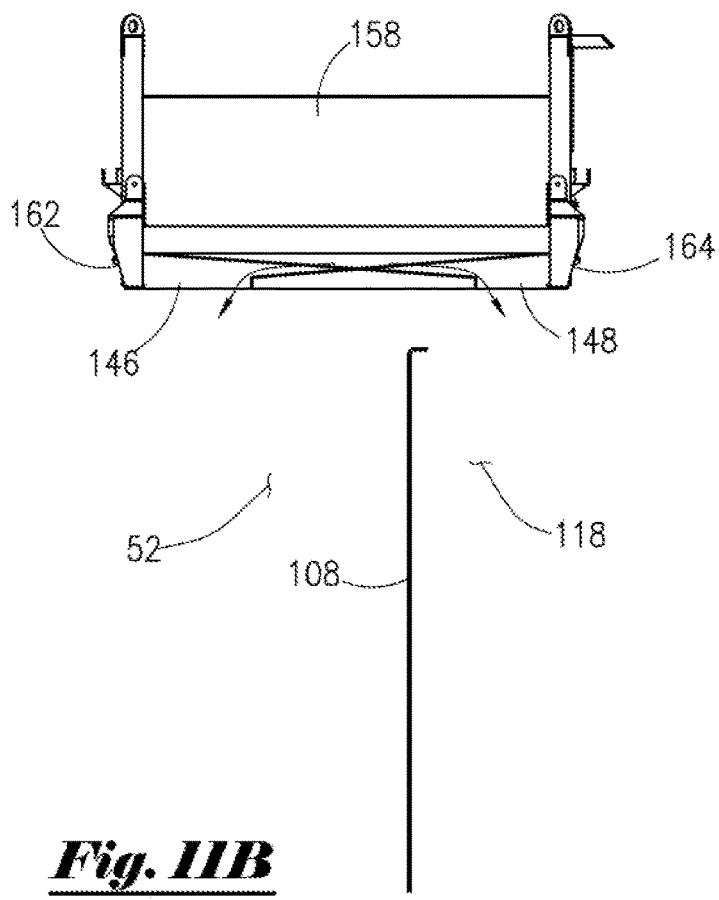
FIG. 11B is a front cross-sectional view of the linear shaker bed and overflow weir shown in FIG. 11A.
Figure 11C:
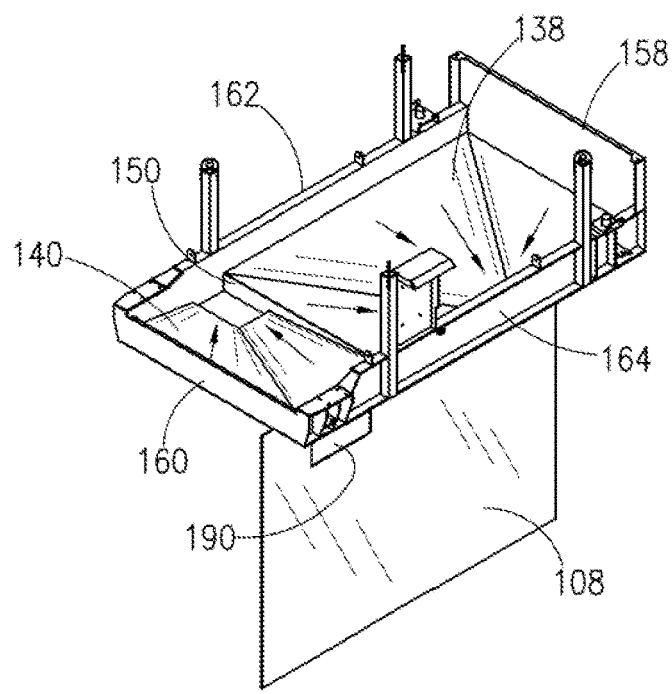
FIG. 11C is a right-side perspective view of the linear shaker bed and overflow weir shown in FIG. 11A.
Figure 11D:
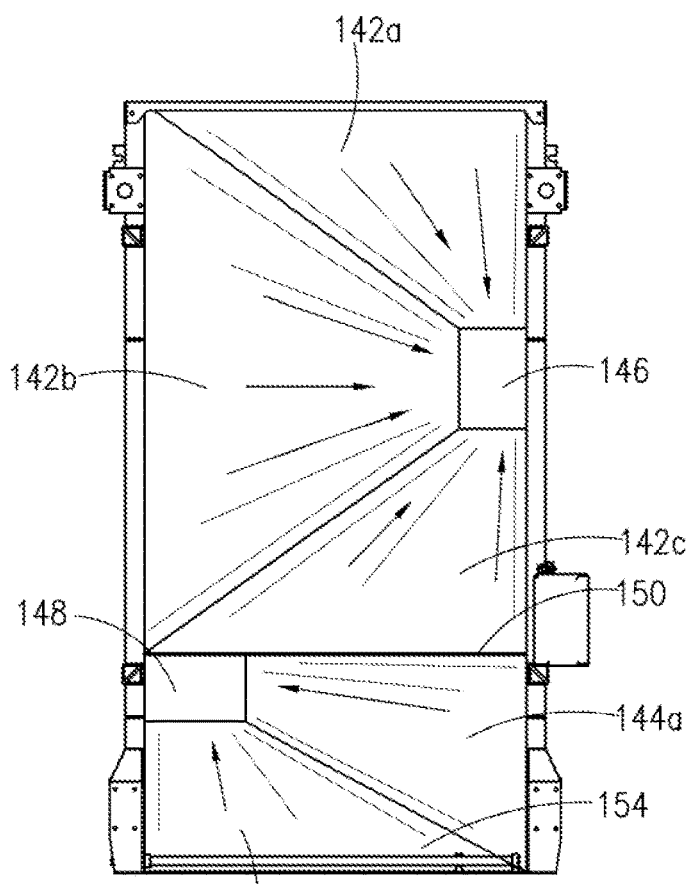
FIG. 11D is a top view of the linear shaker bed shown in FIG. 11A.

FIG. 11D depicts that shaker 44 may include spray bar 154 at, near, or adjacent to side 160. As stated above, spray bar 154 receives clean fluid pumped from overflow tank 32 which is delivered to spray bar 154 by lines fluidly connected to the spray bar rack (not shown) and spray bar manifold 74 (not shown). Spray bar 154 contains a series of outlets though which the clean fluid is sprayed into bed 134 to keep bed 134, and in particular bottom 156, substantially free from any solid buildup. It is to be understood that the same configuration of spray bar 154 may be included in each of the beds of shakers 34, 36, 40.

Figure 12:
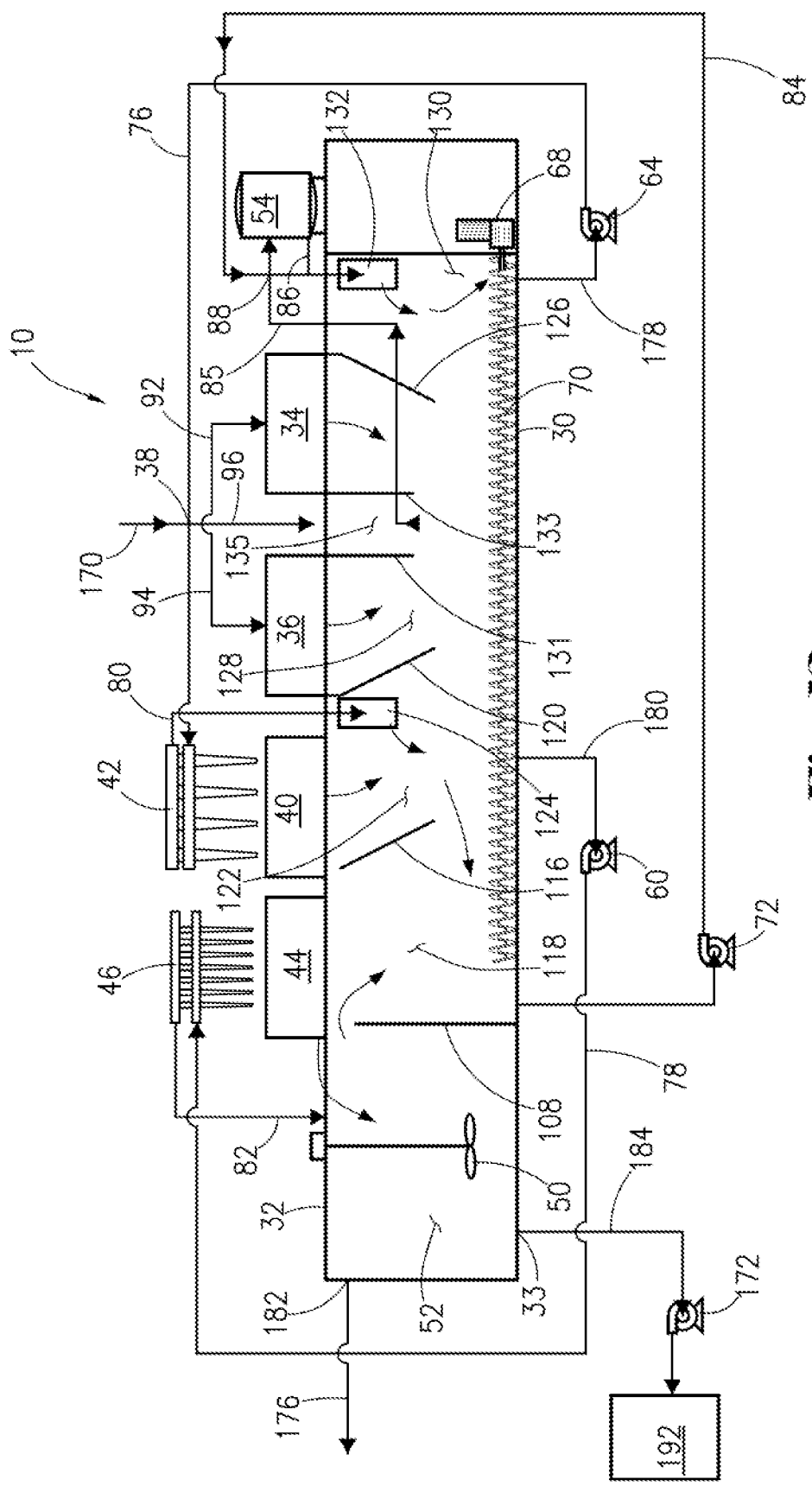
FIG. 12 is a schematic representation of the system.

With reference to FIG. 12, to operate system 10 after power is supplied, flow line 170 from the drilling rig or tank is operatively connected to flow line inlet 38. Equalizing/overflow line 176 is operatively connected to overflow outlet 182. Line 176 is in fluid communication with the rig tanks (not shown) that receive the clean fluid from system 10. Mud system 10 is filled with fluid. Centrifuge feed pump 172 is in fluid communication with clean fluid line 184 that operatively connects to outlet 33 (see FIGS. 1 and 12) of overflow tank 32. The operator should make sure that suction valves for primary desander pump 64, desilter pump 60, degasser/gun line pump 72, and spray bar pump 62 are open. The operator should also make sure discharge valve on primary desander pump 64 is open and suction and discharge valves on standby desander pump 66 are closed. The operator activates shakers 34, 36, 40, and 44 at corresponding starter panels located on each side of each of the aforesaid shakers. The operator activates agitator unit 48 to begin rotation of agitator 50 within overflow tank 32. The operator opens a valve operatively associated with the spray bar rack on each shaker before activating spray bar pump 62. The remote start/stop station for spray bar pump 62 is located on a touchscreen in monitoring station 56. Spray bar pump 62 recirculates clean fluid from overflow tank 32 to the upper spray bars and spray bar 154 in bed 134 of each of shakers 34, 36, 40, 44. The valve supplying flow to each spray bar rack must be open any time spray bar pump 62 is activated to thereby ensure that flow is constantly supplied to bed 134 of shakers 34, 36, 40, 44 so as to minimize solids build up and to prevent deadheading spray bar pump 62, which will cause the mechanical seal to fail.

Again with reference to FIG. 12, the operator activates primary desander pump 64 at the remote start/stop station located on top of starter panel on shaker 40. The operator monitors pump pressure at a gauge on top of hydrocyclone manifold for hydrocyclone assembly 46 or at a touchscreen panel located in monitoring station 56. Gauge pressure should be maintained between 15-20 psi. For initial operation, pressure should be set at 20 psi. If any screen flooding is experienced, the operator should reduce pressure as needed. In the event that primary desander pump 64 does not operate or does not operative effectively, standby desander pump 66 may be put into operation to replace pump 64. To use standby desander pump 66, the operator activates the switch located in control room 58 next to standby desander pump VFD to standby pump. The operator closes the suction and discharge valves to primary desander pump 64 and opens the suction and discharge valve to standby desander pump 66. Once this is done, standby desander pump 66 can be activated at the remote start/stop station located on top of starter panel on shaker 40. The speed, amperage, and pressure of standby desander pump 66 can be monitored at the touch screen panel in monitoring station 56. The speed of pump 66 can be adjusted on the touch screen panel.

With further reference to FIG. 12, the operator activates desilter pump 60 at remote start/stop station located on top of the shaker starter panel on the side of shaker 44. The operator may monitor pump pressure at a gauge on top of a desilter manifold or at the touch screen panel located in monitoring station 56. Pressure may be adjusted by adjusting the pump speed at the touch screen panel. Gauge pressure should be maintained between 25-30 psi. For initial operation, set pressure at 30 psi. If any screen flooding is experienced, the operator may reduce pressure as needed.

With further reference to FIG. 12, auger 70 will start automatically when primary desander pump 64 (or standby desander pump 66) is energized. The operator should walk to front of tank 30 and inspect auger 70 at gearbox (auger drive unit 68) to confirm auger 70 is turning in a clockwise rotation and that no leaking is occurring at the shaft seal of the auger drive unit 68. If there is any leaking of fluid around the shaft of auger drive unit 68, an injectable packing gun may be used to inject packing until leaking stops. Confirm auger motor rpm at touch screen panel located in monitoring station 56. Auger motor should be set at 900 rpm for normal operation. This will result in 12.5 rpm on auger 70 itself. Auger motor amperage will typically run between 9.5-10.5 amps. If amperage increases to 14 amps or more, the auger motor rpm should be increased at the touch screen panel to 1200 rpm in order to decrease the load on the auger screw 70 by conveying the settled solids to the pump suction faster. Once the heavy load has been eliminated, the auger motor speed should be returned to 900 rpm.

Once drilling commences and returns containing solids enter system 10 through flowline 170, mud will begin to be selectively discharged onto one or both of shakers 34, 36 from possum bellies in the shakers. The scalping shakers 34, 36 are typically equipped with 0.65 mm poly screens. As solids are conveyed to the end of shakers 34, 36, they will be released down the shaker slide 186 and into the cuttings box (not shown). The incline of the shaker deck of shakers 34, 36 can be adjusted with the shaker jacking system from −2 degrees to +5 degrees in order to achieve the desired conveyance and maximum dryness of cuttings. In most cases, with 0.65 mm screens installed on scalping shakers 34, 36, only one scalping shaker is required to handle 800 gpm from flow line 170. It is up to the operator to decide based on the cuttings and thickness of the mud if one or both scalping shakers 34, 36 are to be used.

When cuttings begin to appear on scalping shaker 34, 36, solids will shortly begin to be discharged out the bottom of the desander and desilter hydrocyclone assemblies 42, 46 and onto the corresponding shakers 40, 44 where the solids are conveyed to the end of shakers 40, 44 and will release down the shaker slides 186 (see FIG. 10) and into a cuttings box (not shown). The incline of the shaker deck for shakers 40, 44 can be adjusted with the shaker jacking system from 0 degrees to +5 degrees in order to achieve the desired conveyance and maximum dryness of cuttings.

If gas cut mud is detected, vacuum degasser unit 54 should be utilized. The operator should start degasser unit 54. The operator should make sure both valves on the discharge line of degasser/gun line pump 72 are open, both to the degasser jet (eductor 88) and to the gunline (pipe 90). The discharge valve on the degasser unit 54 should also be open. The operator activates the degasser pump 72 at the remote start/stop station located on the vacuum degasser unit 54 to the right of the vacuum pump starter. Once the pump is running, the operator slowly closes the valve to the gunline 90 and leaves the valve to the jet 88 open. The vacuum degasser unit 54 is now fully operating and should continue to operate until gas cut mud is no longer a problem. Once gas cut mud is eliminated, the operator deactivates degasser unit 54 and degasser pump 72. Open the valve to the gunline 90 and close the valve to the degasser jet 88.

With the entire system 10 now running, the operator should continually monitor each shaker 34, 36, 40, 44 and the cuttings each is discharging to insure the maximum dryness is being achieved. The shaker screens should be cleaned and checked for holes once every hour to insure maximum screen life, cleaner mud, and drier cuttings. Also, the operator should monitor pump and auger amperages at the touch screen panel periodically. The operator should also monitor desander and desilter hydrocyclone discharge periodically to insure no roping or plugging occurs. If drilling stops and no flow is coming over the scalping shakers 34, 36, then the desander (hydrocyclone assembly 42) and the desilter (hydrocyclone assembly 46) should be allowed to run until there are minimal solids coming across the screens. Only then can the desander and desilter 42, 46 be shut down.

If a weighted mud is being used, then during the time the rig is not drilling, the desander pump 64 should be run periodically (once every hour) for 2 or 3 minutes in order to resuspend any settled barite. The desander and desilter pumps 64, 60 must be turned on before drilling commences. The gunline 90 can also be used temporarily in conjunction with the desander pump 64 to resuspend any barite. To turn on the gunline 90, the operator should confirm the valve to eductor 88 is closed and the valve to gunline 90 is open. The degasser pump 72 can now be used to feed gunline 84. Turn on the degasser pump 72 at the start/stop station located on the vacuum degasser unit 54 to the right of the vacuum pump starter. The operator can monitor the speed and amperage of the degasser pump 72 at the touch screen panel located in monitoring station 56 and adjust the speed as needed. The gunline 90 should only be run for a minute or two. After gunline 90 is turned off, allow the desander pump 64 to run until there are minimal solids coming across the screen.

Again with reference to FIG. 12, mud from flow line 170 is selectively distributed to one or both of scalping shakers 34, 36, each having approximately 50 square feet of screening area and typically equipped with 0.65 mm polyurethane screen panels. The solids that are captured on scalping shakers 34, 36 are dewatered (dried) and conveyed off the side of processing tank 30 into a cuttings box/tank (not shown). The mud and solids that pass through the screens of scalping shakers 34, 36 enter sand trap zone 128, which is created by two tilted plate underflow baffles 120, 126. In the middle of sand trap zone 128, degasser suction zone 135 is established by two vertical underflow baffles 131, 133. The heavy solids remaining in the mud from the underflow of scalping shakers 34, 36 settle to bottom 110 of tank 30 and are conveyed by shaftless auger 70 to degassed mud zone 130 and suctioned via primary desander pump 64 from tank 30 and pumped through pipe 76 to hydrocyclone assembly 42. The solids laden slurry flows to hydrocyclone assembly 42 (4-10" gMAX hydrocyclones equipped with 1"-2¼" apexes) at a rate up to 1,800 gpm. The underflow of the 4-10" gMAX hydrocyclones discharges onto a linear shaker 40 where they are dewatered and conveyed off the side of tank 30 to a cuttings box/tank (not shown).

With still further reference to FIG. 12, the overflow from the 4-10" gMAX hydrocyclones (hydrocyclone assembly 42) discharges into perforated possum belly 124, which uniformly distributes the desanded mud into desanded mud zone 122. The underflow of linear shaker 40 also discharges into desanded mud zone 122. The mud that enters desanded mud zone 122 is then pumped by desilter pump 60 through pipe 78 to hydrocyclone assembly 46 (14-4" hydrocyclones) at a rate of approximately 1200 gpm. The underflow of the 14-4" hydrocyclones discharges onto linear shaker 44 where they are dewatered and conveyed off the side of tank 30 to a cuttings box/tank (not shown).

The overflow from the 14-4" CAVEX 100 CVX hydrocyclones (hydrocyclone assembly 46) discharges into agitated overflow tank 32 through pipe 82, which is separated from tank 30 by overflow weir 108. The desilted mud backflows over overflow weir 108 into desilted mud zone 118 of tank 30 at a rate equal to the combined overflow and underflow rate of the 14-4" CAVEX 100 CVX hydrocyclones (hydrocyclone assembly 46) minus the flow rate through flow line 170. For example, if the flow rate through the flow line 170 is 800 gpm and the combined overflow and underflow rate of the 14-4" CAVEX 100 CVX hydrocyclones is 1,200 gpm, then 400 gpm of desilted mud will backflow into desilted mud zone 118 of tank 30. The remaining 800 gpm either equalizes with the rest of the mud system through overflow line 176 or is processed through centrifuge pump 172 to centrifuge 192 where fine solids may be separate from the clean fluid before the clean fluid is flowed to the rig tank.

If gas cut mud is detected and the use of degasser unit 54 is required, then mud from desilted mud zone 118 will be pumped to degasser eductor 88 by degasser pump 72, which due to a Venturi effect produced by educator 88, will cause suction pipe 85 to suck gas cut mud from degasser suction zone 135 through suction pipe 85 to degasser unit 54. The degassed mud processed in the degasser unit 54 will be discharged through pipe 86 into perforated possum belly 132, which uniformly distributes the degassed mud into degassed mud zone 130. Any settled solids in sand trap zone 128 and degassed mud zone 130 are conveyed by shaftless auger 70 to suction pipe 178 of primary desander pump 64, which is located in degassed mud zone 130.

Any solids that settle in desanded mud zone 122 or desilted mud zone 118 are conveyed to suction pipe 180 of desilter pump 60, which is located in desanded mud zone 122. Barite specifications require <3% greater than API200 mesh; therefore, any barite that settles to the bottom of tank 30 will report to the 14-4" CAVEX 100 CVX hydrocyclones (hydrocyclone assembly 46) underflow and will be recovered when it passes through the appropriately sized screens, on linear shaker 44, into agitated overflow tank 32.

Figure 13:
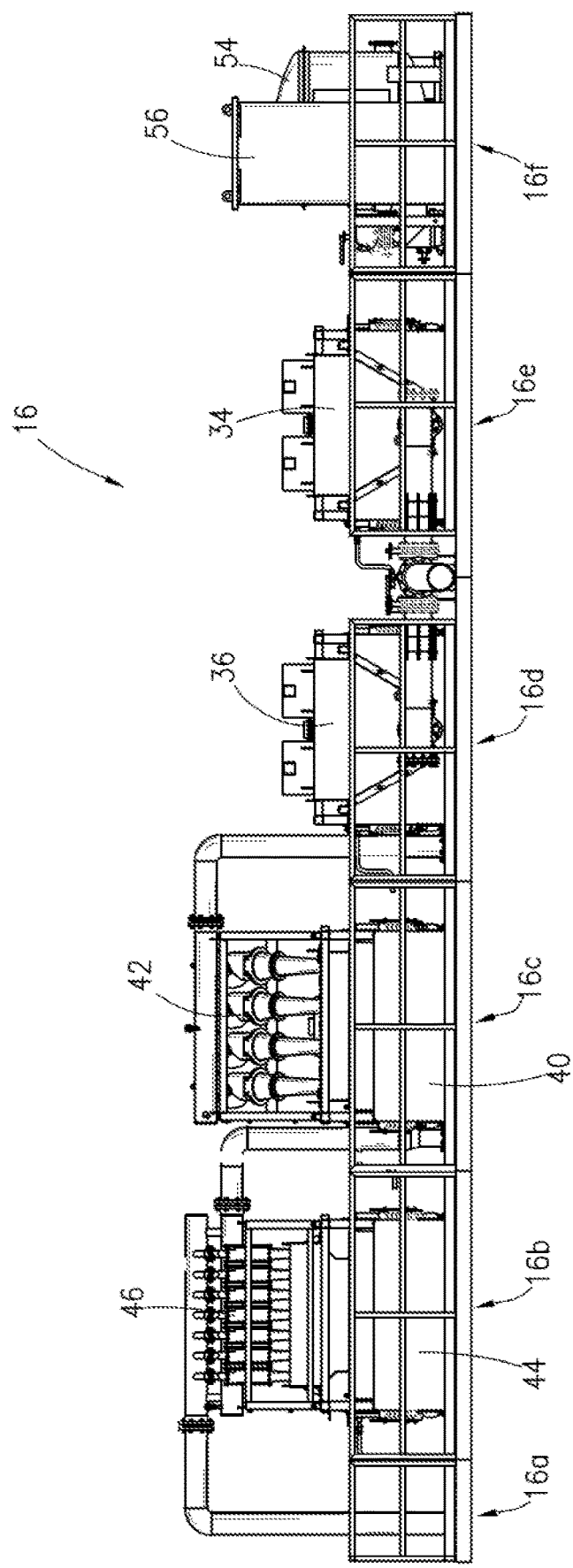
FIG. 13 is side view of an embodiment of the upper platform.

FIG. 13 depicts another embodiment of upper platform 16. In this embodiment, upper platform 16 is composed of upper platform sections supporting one or more of the equipment of system 10. For example, upper platform may consist of six modular upper platform sections 16*a*-16*f*.

Section 16*a* may support equipment such as auger drive unit 68 (not shown). Section 16*b* may support shaker 44 and hydrocyclone assembly 46. Section 16*c* may support shaker 40 and hydrocyclone assembly 42. Section 16*d* may support shaker 36. Section 16*e* may support shaker 34. Section 16*f* may support degasser unit 54 and monitoring station 56. Sections 16*a*-16*f* are placed in operative position on the upper frame of bottom skid frame 14 and detachably connected to the upper frame by any means suitable to maintain sections 16*a*-16*f* in place during operation of system 10. For example, sections 16*a*-16*f* may be bolted to the upper frame of bottom skid frame 56.

System 10 achieves more efficient separation of solids from drilling mud and thus eliminates the need for drying shakers. The cuttings separated by system 10 are dryer. System 10 achieves operational savings on mud and disposal costs.

While preferred embodiments of the invention have been described, it is to be understood that the embodiments described are illustrative only and that the scope of the invention is to be defined solely by the appended claims when accorded a full range of equivalence, many variations and modification naturally occurring to those skilled in the art from a perusal hereof.

What is claimed is:

1. A system for separating solids from a fluid stream comprising:
    a containment vessel having a front sidewall, a rear sidewall, a left sidewall, and a right sidewall, the containment vessel including an open top and a closed bottom, the containment vessel being divided by an overflow weir into a processing tank and an overflow tank, the overflow weir extending from the bottom of the vessel to the top of the vessel and containing an opening so that a clean fluid substantially free of solids contained within the overflow tank may flow through the opening and into the processing tank, the processing tank having a V-shape;
    the processing tank including a shaftless auger operatively positioned at the bottom of the vessel and extending substantially the entire length of the processing tank, the auger being configured to rotate in a direction that transports solids collected at the bottom of the processing tank towards the front sidewall of the vessel;
    the processing tank including a desilted mud zone defined by the overflow weir and a first underflow baffle operatively positioned transverse to the left and right sides of the vessel and extending from the top of the vessel to a point above the bottom of the vessel;
    the processing tank including a desanded mud zone defined by the first underflow baffle and a second underflow baffle operatively positioned transverse to the left and right sides of the vessel and extending from the top of the vessel to a point above the bottom of the vessel;
    the processing tank including a sand trap zone defined by the second under flow baffle and a third underflow baffle operatively positioned transverse to the left and right sides of the vessel and extending from the top of the vessel to a point above the bottom of the vessel;
    the processing tank including a degassed mud zone defined by the third underflow baffle and the front sidewall of the vessel;
    a scalping shaker operatively positioned above the top of the vessel over the sand trap zone of the processing tank, the scalping shaker configured to receive a first fluid containing solids and to process the first fluid containing solids to partially separate solids from the fluid and to produce a first underflow fluid containing solids that is deposited into the sand trap zone of the processing tank;
    a first linear shaker operatively positioned above the top of the vessel over the desanded mud zone of the processing tank;
    a first hydrocyclone assembly operatively positioned above the first linear shaker, the first hydrocyclone assembly configured to receive a second fluid containing solids pumped from the degassed mud zone and to process the second fluid containing solids to partially separate solids from the fluid and to produce a first overflow fluid containing solids that is deposited into the desanded mud zone of the processing tank and a second underflow fluid containing solids that is deposited onto the first linear shaker for processing to partially separate solids from the fluid and to produce a third underflow fluid containing solids that is deposited into the desanded mud zone of the processing tank;
    a second linear shaker operatively positioned above the top of the vessel partially over the desilted mud zone of the processing tank and partially over the overflow tank;
    a second hydrocyclone assembly operatively positioned above the second linear shaker, the second hydrocyclone assembly configured to receive a third fluid containing solids pumped from the desanded mud zone of the processing tank and to process the third fluid containing solids to separate solids from the fluid and to produce an overflow fluid comprising the clean fluid substantially free of solids that is deposited into the overflow tank and a fourth underflow fluid containing solids that is deposited onto the second linear shaker for processing to separate solids from the fluid and to produce an underflow comprising the clean fluid substantially free of solids that is deposited into the overflow tank.

2. The system of claim 1, wherein the first and second underflow baffles are slanted in the direction towards the front sidewall of the vessel and the third baffle is slanted in the direction towards the rear sidewall of the vessel.

3. The system of claim 1, wherein the overflow tank includes an agitator to maintain a fine solids in suspension within the clean fluid substantially free of solids contained within the overflow tank.

4. The system of claim 3, wherein the overflow tank includes an outlet for flow of the clean fluid substantially free of solids from the overflow tank to a rig tank.

5. The system of claim 1, wherein the first hydrocyclone assembly includes four 10 inch hydrocyclones equipped with 1 inch-2¼ inch apexes and the second hydrocyclone assembly includes fourteen 4 inch hydrocyclones equipped with 10 mm-30 mm inch apexes.

6. The system of claim 1, further comprising a second scalping shaker operatively positioned above the top of the vessel over the sand trap zone of the processing tank, the second scalping shaker configured to receive the first fluid containing solids and to process the first fluid containing solids to partially separate solids from the fluid and to produce a fifth underflow fluid containing solids that is deposited into the sand trap zone of the processing tank.

7. The system of claim 1, wherein the processing tank further includes a degasser suction zone defined by a pair of spaced apart baffles each operatively positioned transverse to the left and right sides of the vessel and extending from the top of the vessel to a point above the bottom of the vessel, the system further comprising:
- a degasser unit configured to receive a gas cut fluid suctioned from the degasser suction zone, the degasser unit processing the gas cut fluid to remove a gas from the gas cut fluid to produce a substantially gas free fluid that is deposited into the degassed mud zone of the processing tank;
- an eductor configured to receive and pump a processed fluid from the desilted mud zone of the processing tank and to produce a suction force causing the degasser unit to receive the gas cut fluid from the degasser suction zone.

8. The system of claim 7, further comprising:
- a first perforated possum belly operatively positioned at the top of the vessel within the desanded mud zone of the processing tank, the first perforated possum belly configured to receive the first overflow fluid containing solids from the first hydrocyclone assembly and to uniformly distribute the first overflow containing solids within the desanded mud zone of the processing tank;
- a second perforated possum belly operatively positioned at the top of the vessel within the degassed mud zone of the processing tank, the second perforated possum belly configured to receive the substantially gas free fluid from the degasser unit and to uniformly distribute the substantially gas free fluid within the degassed mud zone of the processing tank.

9. A system for separating solids from a fluid stream comprising:
- a frame assembly including a bottom skid frame and an upper platform interconnected by a plurality of vertical support posts;
- a containment vessel operatively supported by the bottom skid frame, the containment vessel having a front sidewall, a rear sidewall, a left sidewall, and a right sidewall, the containment vessel including an open top and a closed bottom, the containment vessel being divided by an overflow weir into a processing tank and an overflow tank, the overflow weir extending from the bottom of the vessel to the top of the vessel and containing an opening so that a clean fluid substantially free of solids contained within the overflow tank may flow through the opening and into the processing tank, the processing tank having a V-shape;
- the processing tank including a shaftless auger operatively positioned at the bottom of the vessel and extending substantially the entire length of the processing tank, the auger being configured to rotate in a direction that transports solids collected at the bottom of the processing tank towards the front sidewall of the vessel;
- the processing tank including a desilted mud zone defined by the overflow weir and a first underflow baffle operatively positioned transverse to the left and right sides of the vessel and extending from the top of the vessel to a point above the bottom of the vessel;
- the processing tank including a desanded mud zone defined by the first underflow baffle and a second underflow baffle operatively positioned transverse to the left and right sides of the vessel and extending from the top of the vessel to a point above the bottom of the vessel;
- the processing tank including a sand trap zone defined by the second under flow baffle and a third underflow baffle operatively positioned transverse to the left and right sides of the vessel and extending from the top of the vessel to a point above the bottom of the vessel;
- the processing tank including a degassed mud zone defined by the third underflow baffle and the front sidewall of the vessel;
- a first scalping shaker operatively supported by the upper platform, the first scalping shaker being operatively positioned above the top of the vessel over the sand trap zone of the processing tank, the scalping shaker configured to receive a first fluid containing solids and to process the first fluid containing solids to partially separate solids from the fluid and to produce a first underflow fluid containing solids that is deposited into the sand trap zone of the processing tank;
- a first linear shaker operatively supported by the upper platform, the first linear shaker being operatively positioned above the top of the vessel over the desanded mud zone of the processing tank;
- a first hydrocyclone assembly operatively positioned above the first linear shaker, the first hydrocyclone assembly configured to receive a second fluid containing solids pumped from the degassed mud zone and to process the second fluid containing solids to partially separate solids from the fluid and to produce a first overflow fluid containing solids that is deposited into the desanded mud zone of the processing tank and a second underflow fluid containing solids that is deposited onto the first linear shaker for processing to partially separate solids from the fluid and to produce a third underflow fluid containing solids that is deposited into the desanded mud zone of the processing tank;
- a second linear shaker operatively supported by the upper platform, the second linear shaker being operatively positioned above the top of the vessel partially over the desilted mud zone of the processing tank and partially over the overflow tank;
- a second hydrocyclone assembly operatively positioned above the second linear shaker, the second hydrocyclone assembly configured to receive a third fluid containing solids pumped from the desanded mud zone of the processing tank and to process the third fluid containing solids to separate solids from the fluid and to produce an overflow fluid comprising the clean fluid substantially free of solids that is deposited into the overflow tank and a fourth underflow fluid containing solids that is deposited onto the second linear shaker for processing to separate solids from the fluid and to produce an underflow comprising the clean fluid substantially free of solids that is deposited into the overflow tank.

10. The system of claim 9, further comprising a second scalping shaker operatively supported by the upper platform, the second scalping shaker being operatively positioned above the top of the vessel over the sand trap zone of the processing tank, the second scalping shaker configured to receive the first fluid containing solids and to process the first fluid containing solids to partially separate solids from the fluid and to produce a fifth underflow fluid containing solids that is deposited into the sand trap zone of the processing tank.

11. The system of claim 10, wherein the processing tank further includes a degasser suction zone defined by a pair of spaced apart baffles each operatively positioned transverse to the left and right sides of the vessel and extending from the top of the vessel to a point above the bottom of the vessel, the system further comprising:
- a degasser unit operatively supported by the upper platform, the degasser unit configured to receive a gas cut fluid suctioned from the degasser suction zone, the degasser unit processing the gas cut fluid to remove a gas from the gas cut fluid to produce a substantially gas free fluid;

an eductor configured to receive and pump a processed fluid from the desilted mud zone of the processing tank and to produce a suction force causing the degasser unit to receive the gas cut fluid from the degasser suction zone.

12. The system of claim 11, further comprising:

a first perforated possum belly operatively positioned at the top of the vessel within the desanded mud zone of the processing tank, the first perforated possum belly configured to receive the first overflow fluid containing solids from the first hydrocyclone assembly and to uniformly distribute the first overflow containing solids within the desanded mud zone of the processing tank;

a second perforated possum belly operatively positioned at the top of the vessel within the degassed mud zone of the processing tank, the second perforated possum belly configured to receive the substantially gas free fluid from the degasser unit and to uniformly distribute the substantially gas free fluid within the degassed mud zone of the processing tank.

13. The system of claim 9, further comprising a stair assembly operatively connected to the upper platform to provide an operator access to the upper platform.

14. The system of claim 13, further comprising a railing substantially extending around a periphery of the upper platform.

15. The system of claim 14, further comprising a roof operatively connected to the upper platform by a plurality of vertical support posts.

16. The system of claim 15, wherein the roof is configured to be detachable from the upper platform.

17. The system of claim 15, wherein the vertical support posts connecting the roof to the upper platform are configured to be telescoping to permit the raising and lower of the vertical support posts relative to the upper platform.

18. The system of claim 9, further comprising a control room containing equipment to operate the containment vessel, the scalping shaker, the first linear shaker, the first hydrocyclone assembly, the second linear shaker, the second hydrocyclone assembly, or any combination thereof.

19. The system of claim 18, further comprising a monitoring station positioned on the upper platform containing a display screen to operate or monitor the functioning of the system.

20. The system of claim 9, wherein the upper platform comprises a plurality of individual platforms and wherein the scalping shaker, the first linear shaker, and the second linear shaker are each supported by one of the plurality of individual platforms.

* * * * *